United States Patent
Byun et al.

(10) Patent No.: US 10,895,667 B2
(45) Date of Patent: *Jan. 19, 2021

(54) ANTIREFLECTION FILM

(71) Applicant: LG CHEM, LTD., Seoul (KR)

(72) Inventors: Jin Seok Byun, Daejeon (KR); Ja Pil Koo, Daejeon (KR); Boo Kyung Kim, Daejeon (KR); Seok Hoon Jang, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

This patent is subject to a terminal disclaimer.

(21) Appl. No.: 16/068,249

(22) PCT Filed: Mar. 9, 2017

(86) PCT No.: PCT/KR2017/002580
§ 371 (c)(1),
(2) Date: Jul. 5, 2018

(87) PCT Pub. No.: WO2017/155335
PCT Pub. Date: Sep. 14, 2017

(65) Prior Publication Data
US 2019/0025467 A1    Jan. 24, 2019

(30) Foreign Application Priority Data

| Mar. 9, 2016 | (KR) | 10-2016-0028468 |
| Mar. 11, 2016 | (KR) | 10-2016-0029336 |

(Continued)

(51) Int. Cl.
*G02B 1/11*    (2015.01)
*G02B 1/12*    (2006.01)
(Continued)

(52) U.S. Cl.
CPC ............. *G02B 1/11* (2013.01); *B05D 3/0254* (2013.01); *B05D 3/067* (2013.01); *B32B 7/02* (2013.01);
(Continued)

(58) Field of Classification Search
CPC ........... G02B 1/11; G02B 1/111; G02B 1/115; G02B 1/113; G02B 1/12; G02B 1/14;
(Continued)

(56) References Cited

U.S. PATENT DOCUMENTS

| 5,740,226 A | 4/1998 | Komiya et al. |
| 6,633,392 B1 | 10/2003 | Singh et al. |

(Continued)

FOREIGN PATENT DOCUMENTS

| CN | 1387052 A | 12/2002 |
| CN | 101285898 A | 10/2008 |

(Continued)

OTHER PUBLICATIONS

Extended European Search Report issued for European Patent Application No. 17 76 3596 dated Nov. 29, 2018, 9 pages.

(Continued)

*Primary Examiner* — Jie Lei
(74) *Attorney, Agent, or Firm* — Rothwell, Figg, Ernst & Manbeck, P.C.

(57) ABSTRACT

The present invention relates to an antireflection film which exhibits one extremum at a thickness of 35 nm to 55 nm from the surface and exhibiting one extremum at a thickness of 85 nm to 105 nm from the surface in a graph showing the result of Fourier transform analysis for the result of X-ray reflectivity measurement using Cu—K-alpha rays.

17 Claims, 14 Drawing Sheets

(30) Foreign Application Priority Data

Mar. 14, 2016 (KR) .................. 10-2016-0030395
Mar. 9, 2017 (KR) .................. 10-2017-0029954

(51) Int. Cl.

| | | |
|---|---|---|
| *C08L 27/12* | (2006.01) | |
| *C08L 33/10* | (2006.01) | |
| *C08L 83/04* | (2006.01) | |
| *C08C 19/40* | (2006.01) | |
| *B32B 7/02* | (2019.01) | |
| *B32B 27/08* | (2006.01) | |
| *B32B 27/18* | (2006.01) | |
| *C09D 5/00* | (2006.01) | |
| *G02B 1/113* | (2015.01) | |
| *G02B 5/18* | (2006.01) | |
| *C09D 4/06* | (2006.01) | |
| *G01N 23/207* | (2018.01) | |
| *C09D 5/33* | (2006.01) | |
| *B32B 7/023* | (2019.01) | |
| *G02B 1/14* | (2015.01) | |
| *C09D 7/40* | (2018.01) | |
| *B05D 3/02* | (2006.01) | |
| *B05D 3/06* | (2006.01) | |
| *C09D 135/02* | (2006.01) | |
| *G02B 1/115* | (2015.01) | |
| *C08J 7/04* | (2020.01) | |
| *C09D 4/00* | (2006.01) | |
| *C08K 7/18* | (2006.01) | |
| *C09D 7/61* | (2018.01) | |
| *C08K 3/01* | (2018.01) | |
| *B05D 1/28* | (2006.01) | |
| *C08K 3/36* | (2006.01) | |
| *C08K 7/26* | (2006.01) | |

(52) U.S. Cl.
CPC .............. *B32B 7/023* (2019.01); *B32B 27/08* (2013.01); *B32B 27/18* (2013.01); *C08C 19/40* (2013.01); *C08J 7/042* (2013.01); *C08L 27/12* (2013.01); *C08L 33/10* (2013.01); *C08L 83/04* (2013.01); *C09D 4/00* (2013.01); *C09D 4/06* (2013.01); *C09D 5/00* (2013.01); *C09D 5/004* (2013.01); *C09D 5/006* (2013.01); *C09D 7/67* (2018.01); *C09D 135/02* (2013.01); *G01N 23/207* (2013.01); *G02B 1/113* (2013.01); *G02B 1/115* (2013.01); *G02B 1/12* (2013.01); *G02B 1/14* (2015.01); *G02B 5/18* (2013.01); *B05D 1/28* (2013.01); *B32B 2264/102* (2013.01); *B32B 2264/12* (2013.01); *C08J 2301/02* (2013.01); *C08J 2435/02* (2013.01); *C08K 3/01* (2018.01); *C08K 3/36* (2013.01); *C08K 7/18* (2013.01); *C08K 7/26* (2013.01); *C08K 2201/011* (2013.01); *C08L 2203/16* (2013.01); *C09D 7/61* (2018.01)

(58) Field of Classification Search
CPC .......... G02B 5/18; G02B 5/282; G02B 5/208; B32B 7/02; B32B 27/08; B32B 27/18; B32B 2264/12; B32B 2264/102; B32B 7/023; C08L 27/12; C08L 33/10; C08L 83/04; C08L 2235/16; C08C 19/40; C09D 5/00; C09D 4/06; C09D 5/004; C09D 7/67; C09D 5/006; C09D 135/02; C09D 4/00; C09D 7/61; C08K 7/18; C08K 3/01; C08K 3/36; C08K 7/26; C08K 2201/011; C08J 7/042; C08J 2301/02; C08J 2435/02; B05D 1/28; B05D 3/067; B05D 3/0254; G01N 23/207; C08F 265/06

USPC ....... 359/601, 359, 360, 581, 584–589, 884; 428/310.5, 327, 328, 425.9, 432
See application file for complete search history.

(56) References Cited

U.S. PATENT DOCUMENTS

| | | |
|---|---|---|
| 6,780,547 B2 | 8/2004 | Motonaga et al. |
| 7,335,698 B2 | 2/2008 | Mano et al. |
| 7,629,051 B2 | 12/2009 | Fukushige et al. |
| 7,964,685 B2 | 6/2011 | Yoshiwara et al. |
| 8,343,622 B2 | 1/2013 | Liu et al. |
| 8,691,351 B2 | 8/2014 | Asakura et al. |
| 8,795,825 B2 | 8/2014 | Kim et al. |
| 9,310,525 B2 | 4/2016 | Shibuya et al. |
| 9,658,467 B2 | 5/2017 | Hervieu et al. |
| 9,951,229 B2 | 4/2018 | Cho et al. |
| 10,222,510 B2 | 3/2019 | Song et al. |
| 10,234,599 B2 | 3/2019 | Byun et al. |
| 2002/0187324 A1 | 12/2002 | Shoshi et al. |
| 2004/0044127 A1 | 3/2004 | Okubo et al. |
| 2005/0038187 A1 | 2/2005 | Mano et al. |
| 2005/0200278 A1 | 9/2005 | Jones et al. |
| 2005/0227055 A1 | 10/2005 | Senkevich et al. |
| 2006/0007430 A1 | 1/2006 | Lotz et al. |
| 2006/0274423 A1 | 12/2006 | Fukushige et al. |
| 2007/0291367 A1 | 12/2007 | Hamamoto et al. |
| 2008/0032053 A1 | 2/2008 | Kourtakis et al. |
| 2009/0246415 A1 | 10/2009 | Horie et al. |
| 2010/0021694 A1 | 1/2010 | Wakizaka et al. |
| 2010/0039708 A1 | 2/2010 | Suzuki et al. |
| 2010/0196687 A1 | 8/2010 | Isono et al. |
| 2010/0311868 A1 | 12/2010 | Bekiarian et al. |
| 2012/0200933 A1 | 8/2012 | Akiyama et al. |
| 2013/0088779 A1 | 4/2013 | Kang et al. |
| 2013/0089178 A1 | 4/2013 | Mazor et al. |
| 2013/0135726 A1 | 5/2013 | Wakizaka et al. |
| 2013/0143028 A1 | 6/2013 | Asahi et al. |
| 2013/0216729 A1 | 8/2013 | Kim et al. |
| 2013/0216818 A1 | 8/2013 | Kim et al. |
| 2013/0265529 A1 | 10/2013 | Wakizaki et al. |
| 2013/0329297 A1 | 12/2013 | Hayashi et al. |
| 2014/0016204 A1 | 1/2014 | Hakuta et al. |
| 2014/0037741 A1 | 2/2014 | Armes et al. |
| 2014/0079937 A1 | 3/2014 | Jung et al. |
| 2014/0340755 A1 | 11/2014 | Eguchi et al. |
| 2015/0079348 A1 | 3/2015 | Mizoshita et al. |
| 2015/0152279 A1 | 6/2015 | Kai et al. |
| 2015/0274983 A1 | 10/2015 | Cho et al. |
| 2018/0106929 A1 | 4/2018 | Song et al. |
| 2018/0231687 A1* | 8/2018 | Byun .................. C08C 19/40 |
| 2018/0231688 A1 | 8/2018 | Byun et al. |

FOREIGN PATENT DOCUMENTS

| | | |
|---|---|---|
| CN | 101288004 A | 10/2008 |
| CN | 101765791 A | 6/2010 |
| CN | 102119344 A | 7/2011 |
| CN | 102736138 A | 10/2012 |
| CN | 103364845 A | 10/2013 |
| CN | 103460079 A | 12/2013 |
| CN | 103782203 A | 5/2014 |
| CN | 104066778 A | 9/2014 |
| CN | 104458589 A | 3/2015 |
| CN | 107635765 B | 12/2018 |
| EP | 3248776 A1 | 11/2017 |
| EP | 3385070 A1 | 10/2018 |
| JP | 2000-035408 A | 2/2000 |
| JP | 2001-290257 A | 10/2001 |
| JP | 2003-142476 A | 5/2003 |
| JP | 2003-322627 A | 11/2003 |
| JP | 2004-212791 A | 7/2004 |

(56) References Cited

FOREIGN PATENT DOCUMENTS

| | | |
|---|---|---|
| JP | 2004-255635 A | 9/2004 |
| JP | 2004-314599 A | 11/2004 |
| JP | 2005-062350 A | 3/2005 |
| JP | 2005-213366 A | 8/2005 |
| JP | 2005-234003 A | 9/2005 |
| JP | 2007-011309 A | 1/2007 |
| JP | 2007-078711 A | 3/2007 |
| JP | 2007-098833 A | 4/2007 |
| JP | 2007-272131 A | 10/2007 |
| JP | 2007-272132 A | 10/2007 |
| JP | 2008-107792 A | 5/2008 |
| JP | 2009-163260 A | 7/2009 |
| JP | 2009-217258 A | 9/2009 |
| JP | 2009-244382 A | 10/2009 |
| JP | 2010-084017 A | 4/2010 |
| JP | 2010-085579 A | 4/2010 |
| JP | 2011-081120 A | 4/2011 |
| JP | 2011-088787 A | 5/2011 |
| JP | 2011-102977 A | 5/2011 |
| JP | 2011-178062 A | 9/2011 |
| JP | 2011-248036 A | 12/2011 |
| JP | 2011-255527 A | 12/2011 |
| JP | 2012-036479 A | 2/2012 |
| JP | 2012-063687 A | 3/2012 |
| JP | 2012-159744 A | 8/2012 |
| JP | 2012-198330 A | 10/2012 |
| JP | 2012-247606 A | 12/2012 |
| JP | 2013-008025 A | 1/2013 |
| JP | 2013-130865 A | 7/2013 |
| JP | 2013-178534 A | 9/2013 |
| JP | 2013-205645 A | 10/2013 |
| JP | 2013-228741 A | 11/2013 |
| JP | 2013-254118 A | 12/2013 |
| JP | 2014-016607 A | 1/2014 |
| JP | 5450708 B2 | 3/2014 |
| JP | 2014-059368 A | 4/2014 |
| JP | 2014-074779 A | 4/2014 |
| JP | 2014-529762 A | 11/2014 |
| JP | 2014-240929 A | 12/2014 |
| JP | 2015-028874 A | 2/2015 |
| JP | 2015-072464 A | 4/2015 |
| JP | 2015-108733 A | 6/2015 |
| JP | 2015-122060 A | 7/2015 |
| JP | 2015-143700 A | 8/2015 |
| JP | 2015-232614 A | 12/2015 |
| JP | 2015-536477 A | 12/2015 |
| JP | 2016-509250 A | 3/2016 |
| JP | 2017-021293 A | 1/2017 |
| JP | 2017-040936 A | 2/2017 |
| JP | 2017-049313 A | 3/2017 |
| JP | 2018-123043 A | 8/2018 |
| JP | 2018-530770 A | 10/2018 |
| KR | 10-2006-0046318 A | 5/2006 |
| KR | 10-2008-0050335 A | 6/2008 |
| KR | 10-2009-0046873 A | 5/2009 |
| KR | 10-2009-0105545 A | 10/2009 |
| KR | 10-2010-0039869 A | 4/2010 |
| KR | 10-0960442 B1 | 5/2010 |
| KR | 10-2011-0060810 A | 6/2011 |
| KR | 10-2011-0121233 A | 11/2011 |
| KR | 10-2012-0093212 A | 8/2012 |
| KR | 10-1194180 B1 | 10/2012 |
| KR | 10-1226228 B1 | 1/2013 |
| KR | 10-2013-0120223 A | 11/2013 |
| KR | 10-2014-0006876 A | 1/2014 |
| KR | 10-2014-0006922 A | 1/2014 |
| KR | 10-2014-0037080 A | 3/2014 |
| KR | 10-1378603 B1 | 3/2014 |
| KR | 10-2014-0050538 A | 4/2014 |
| KR | 10-2015-0120264 A | 10/2015 |
| TW | 200807014 A | 2/2008 |
| TW | 200833763 A | 8/2008 |
| TW | 201011356 A | 3/2010 |
| TW | 201128215 A | 8/2011 |
| TW | 201221599 A | 6/2012 |
| TW | 201606357 A | 2/2016 |
| WO | 2008-081885 A1 | 7/2008 |
| WO | 2009-120983 A2 | 10/2009 |
| WO | 2012-147527 A1 | 11/2012 |
| WO | 2012-157682 A1 | 11/2012 |
| WO | 2013-099931 A1 | 7/2013 |
| WO | 2017-157682 A1 | 9/2017 |

OTHER PUBLICATIONS

Opalinska, et al.; "Size-dependent density of zirconia nanoparticles;" Beilstein Journal of Nanotechnology; 6; (2015); pp. 27-35.
Kimoto, et al.; "Effective Density of Silica Nanoparticle Size Standards;" International Aerosol Conference; (2014); p. 1.
Extended European Search Report issued in European patent application No. 17763598A dated Aug. 1, 2018, 8 pages.
Extended European Search Report issued in European patent application No. 17733956.1 dated Sep. 3, 2018, 6 pages.
Search Report & Written Opinion issued for PCT application No. PCT/KR2017/002580 dated Jun. 13, 2017 (14 pages).
Search Report & Written Opinion issued for PCT application No. PCT/KR2017/002582 dated Jun. 30, 2017 (10 pages).
Search Report & Written Opinion issued for PCT application No. PCT/KR2017/002583 dated Jun. 13, 2017 (13 pages).
Office Action issued for TW106108093 dated Nov. 29, 2017 (10 pages).
Kimoto et al., "Effective Density of Silica Nanoparticle Size Standards", 2014 International Aerosol Conference, (2014); p. 1.
Amemiya, et al., "Principle of Small-Angle X-ray Scattering and a Perspective", (2006) The Japanese Society for Synchrotron Radiation Research, vol. 19, No. 6, 11 pages, (with English Abstract).
"Organosilicasol", Nissan Chemical Corporation, retrieved from: https://www.nissanchem.co.jp/products/materials/inorganic/products/02/ on Jul. 1, 2019, 6 pages.
"Nanomaterial information providing sheet—Amorphous colloidal silica", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO3.pdf, 19 pages.
"Nanomaterial information providing sheet—Silica manufactured by a dry method called as flame hydrolysis method or combustion hydrolysis method", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO2.pdf, 10 pages.
37 CFR 1.132 Declaration cited in U.S. Appl. No. 15/554,966. Retrieved Feb. 29, 2020 and cited in Office Action dated Mar. 5, 2020 in U.S. Appl. No. 16/239,376 (5 pages).
Office Action dated Mar. 5, 2020 in U.S. Appl. No. 16/239,376 (12 pages).
Polymer Molecular Weight Distribution and Definitions of MW Averages, Agilent Technologies, (Apr. 2015), pp. 1-4.

* cited by examiner

[FIG. 1]
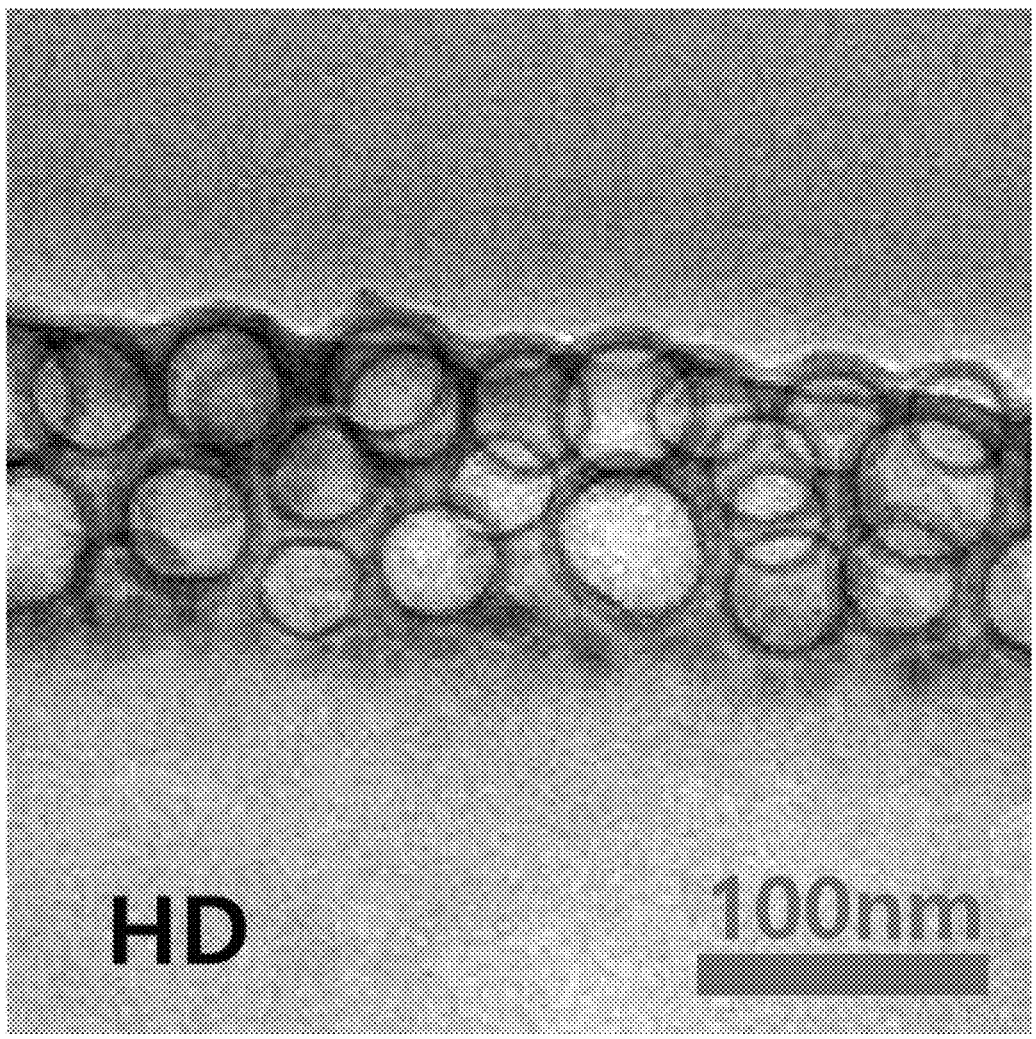

[FIG. 2]
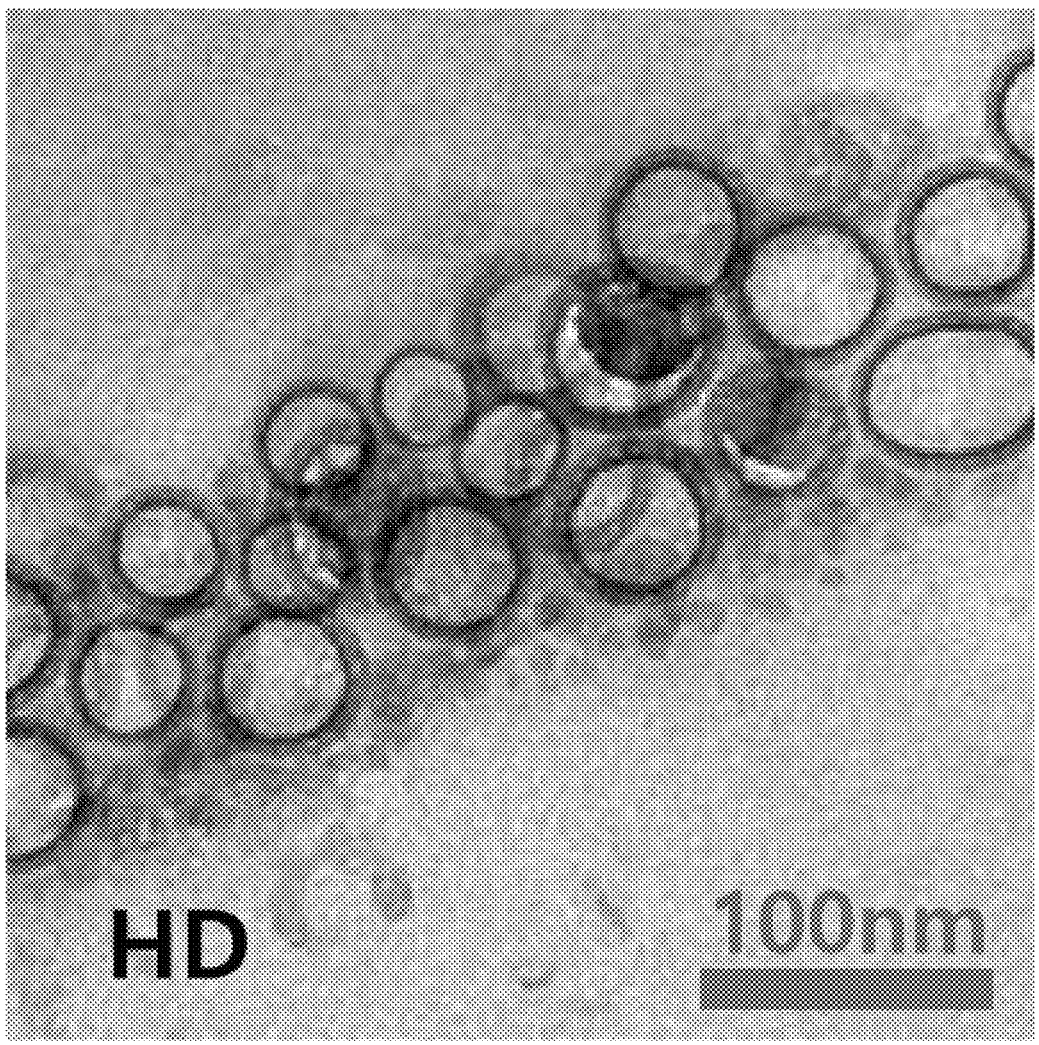

[FIG. 3]
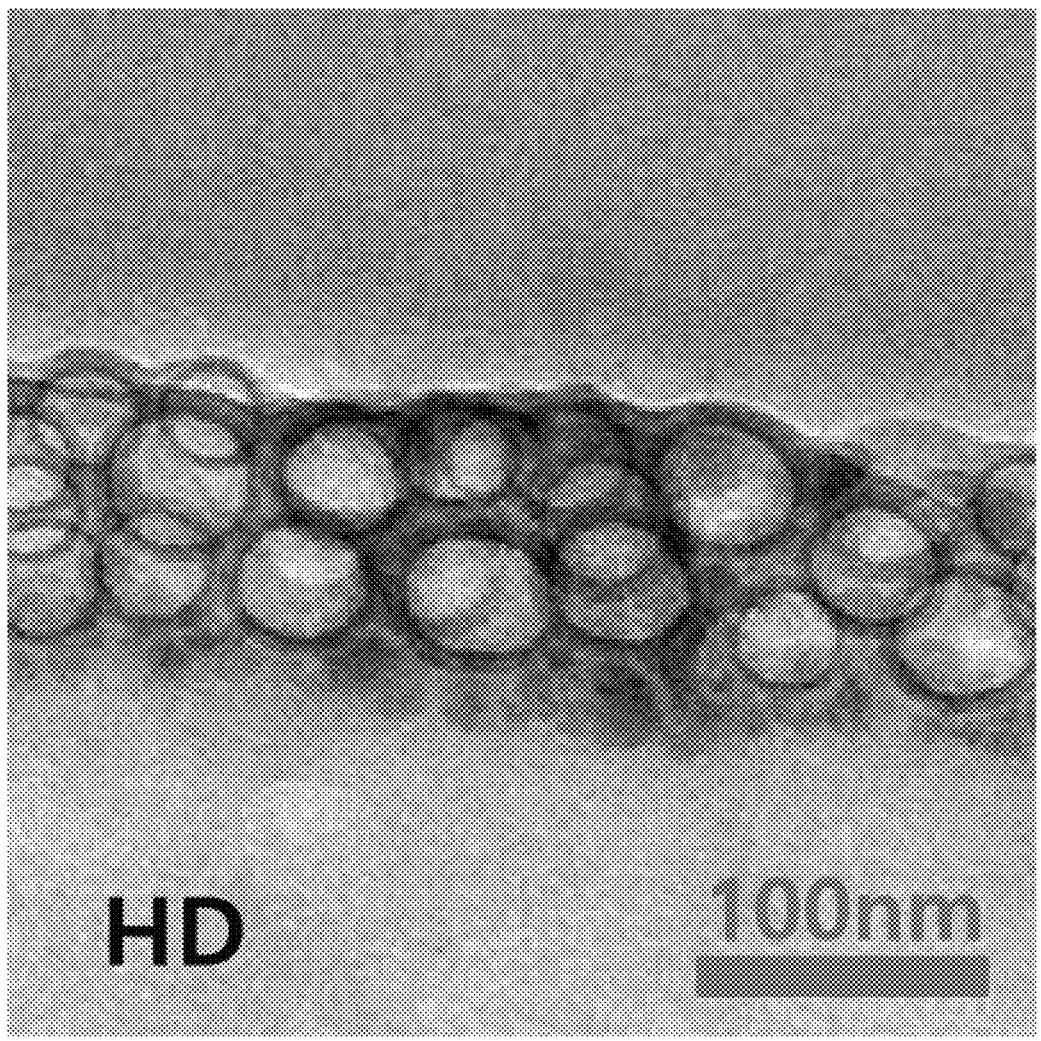

[FIG. 4]
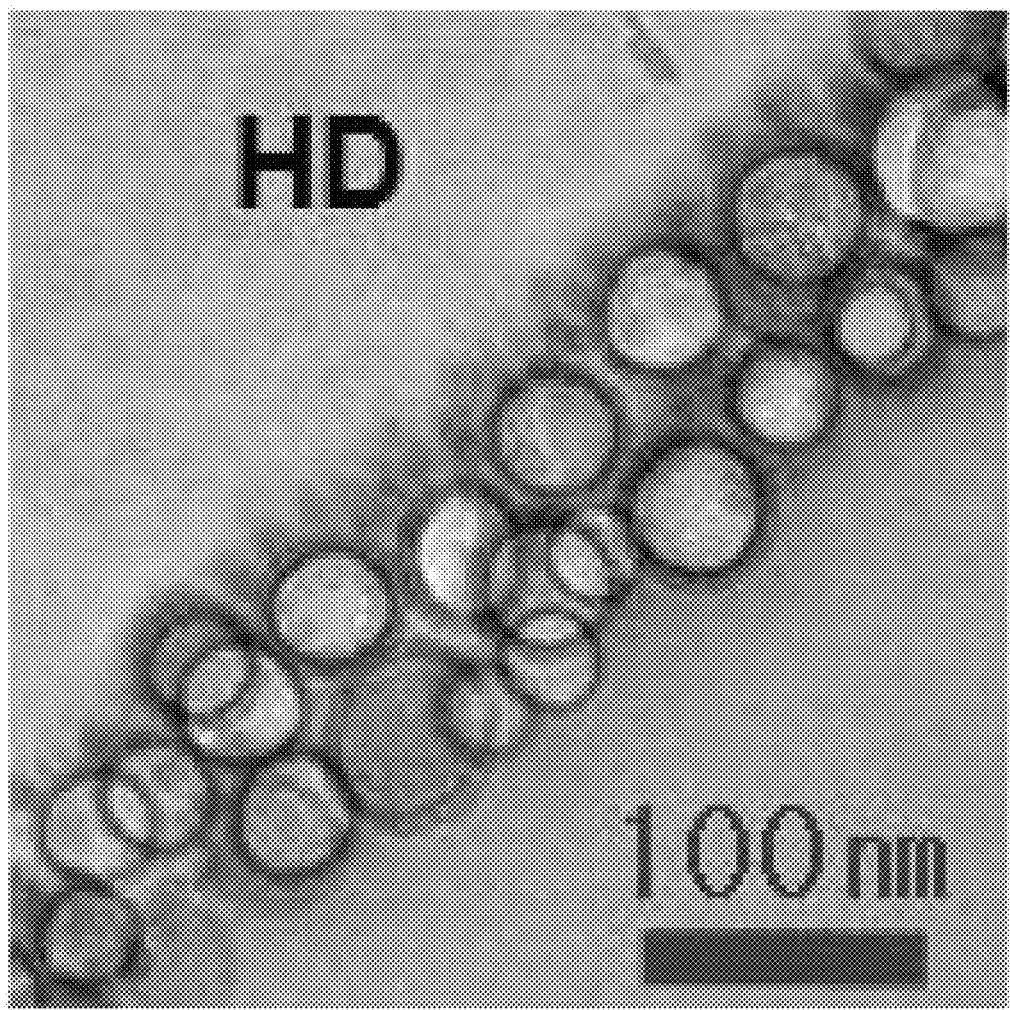

[FIG. 5]
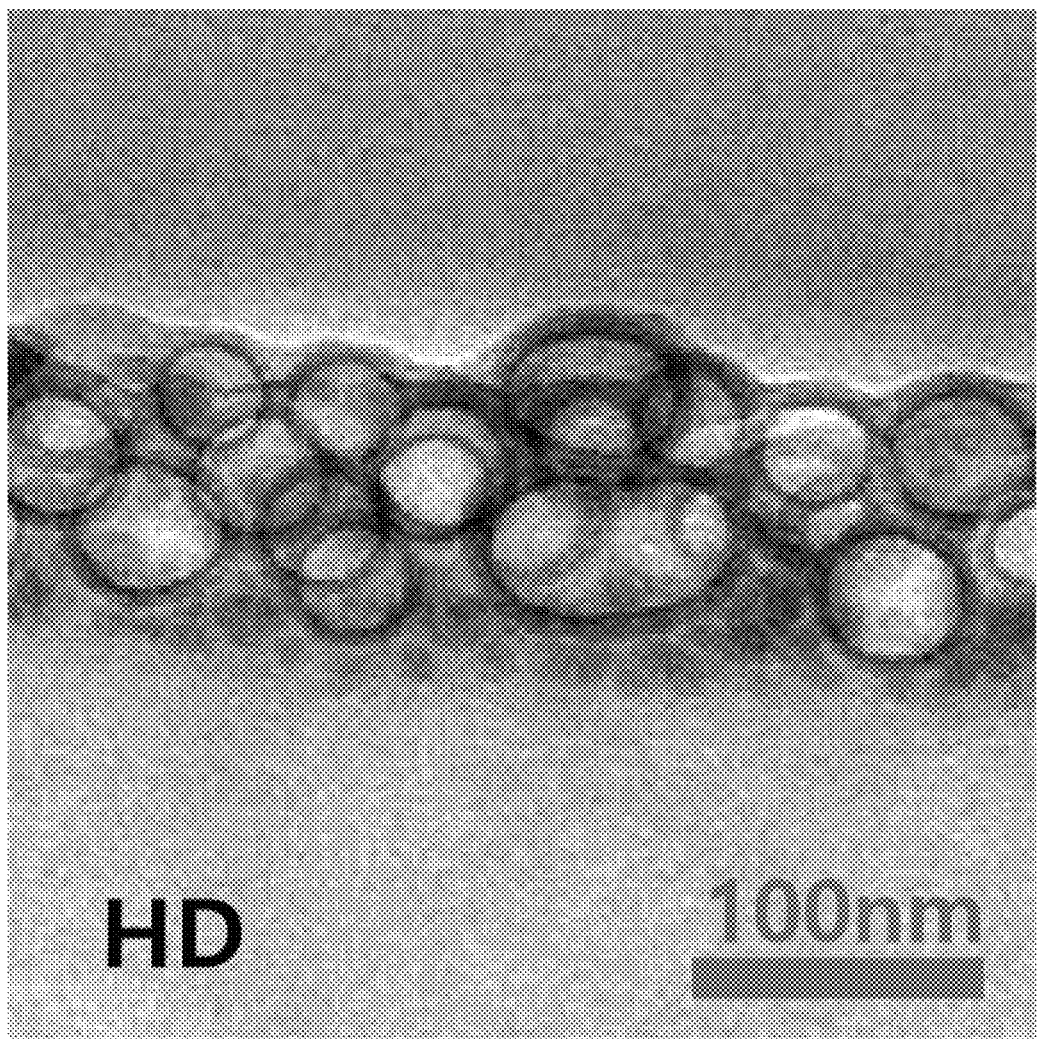

[FIG. 6]
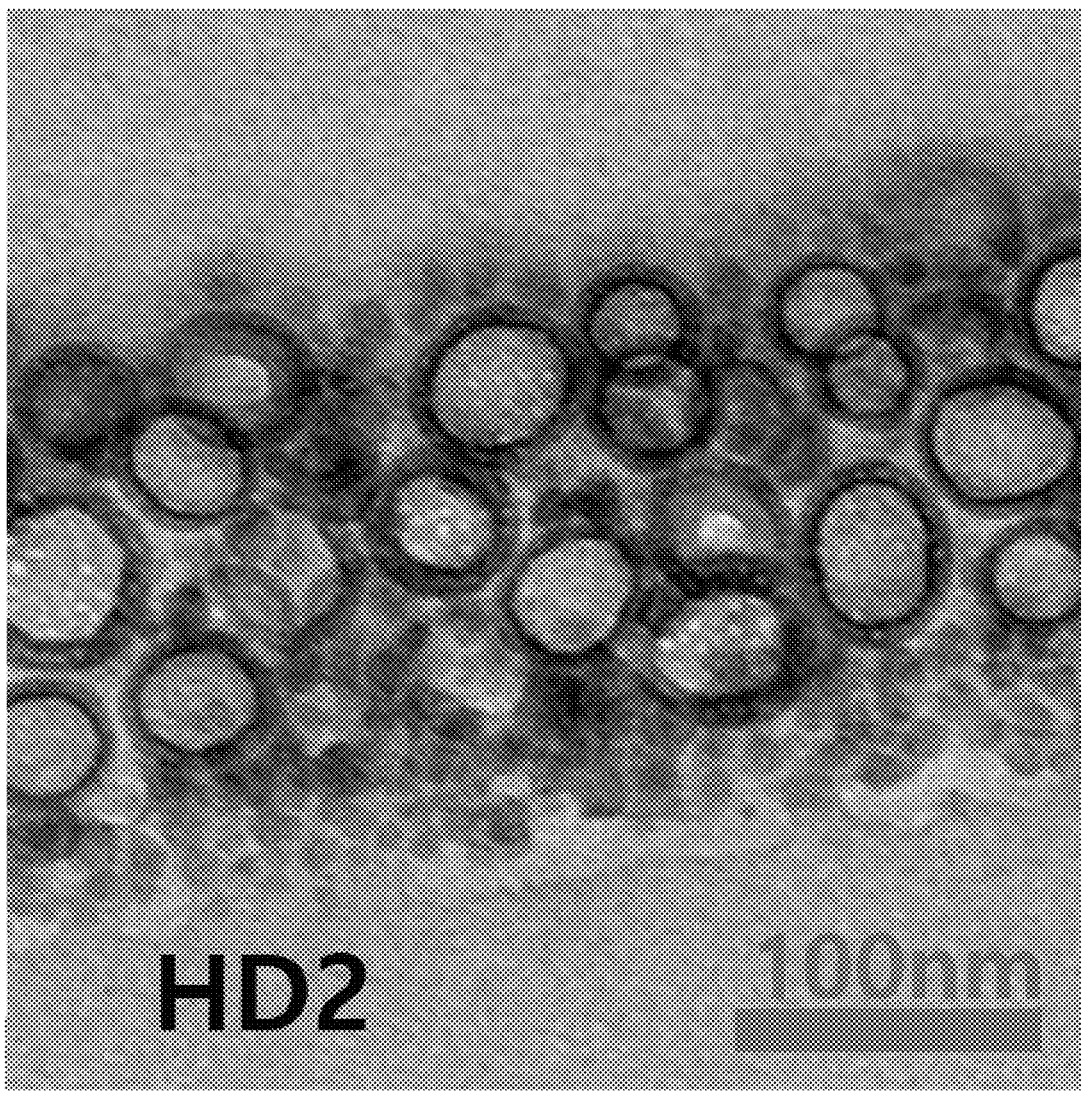

[FIG. 7]
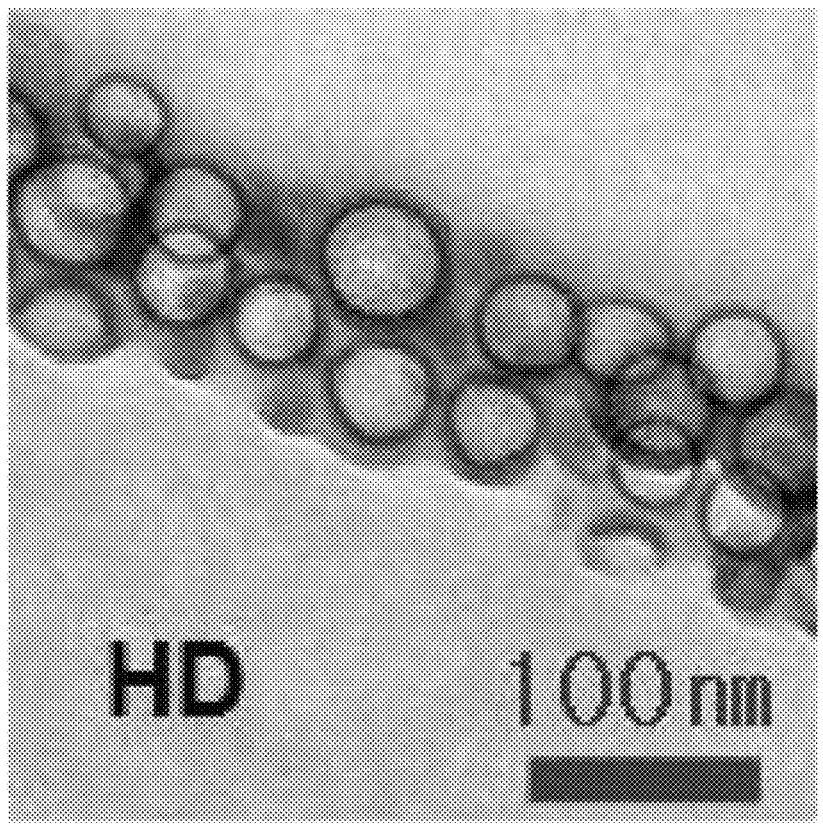

[FIG. 8]
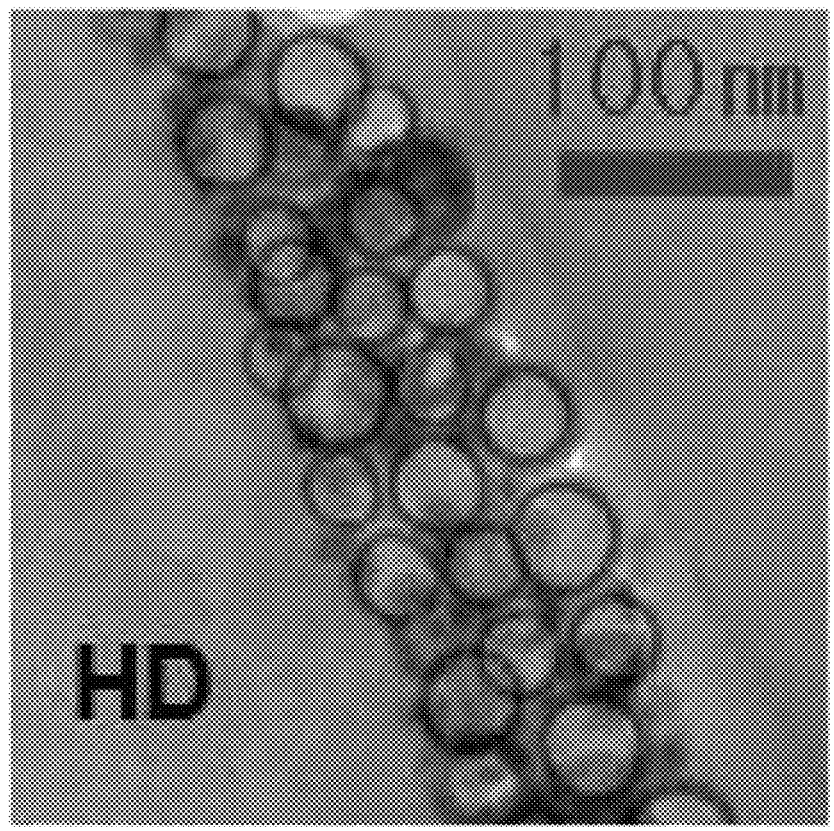

[FIG. 9]
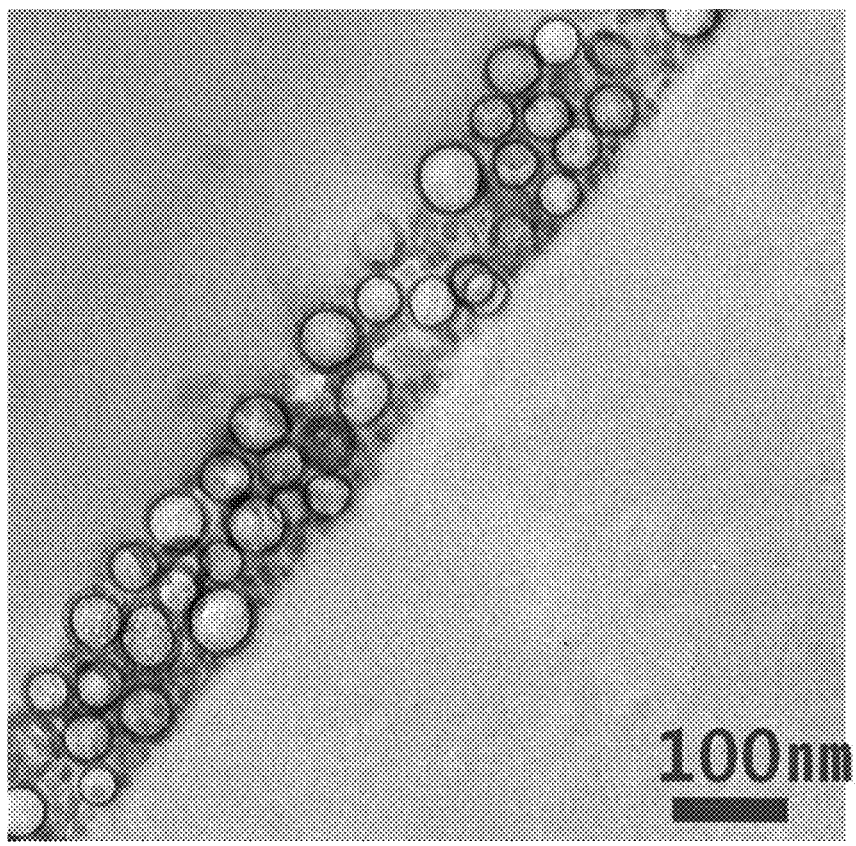

[FIG. 10]
Example 1
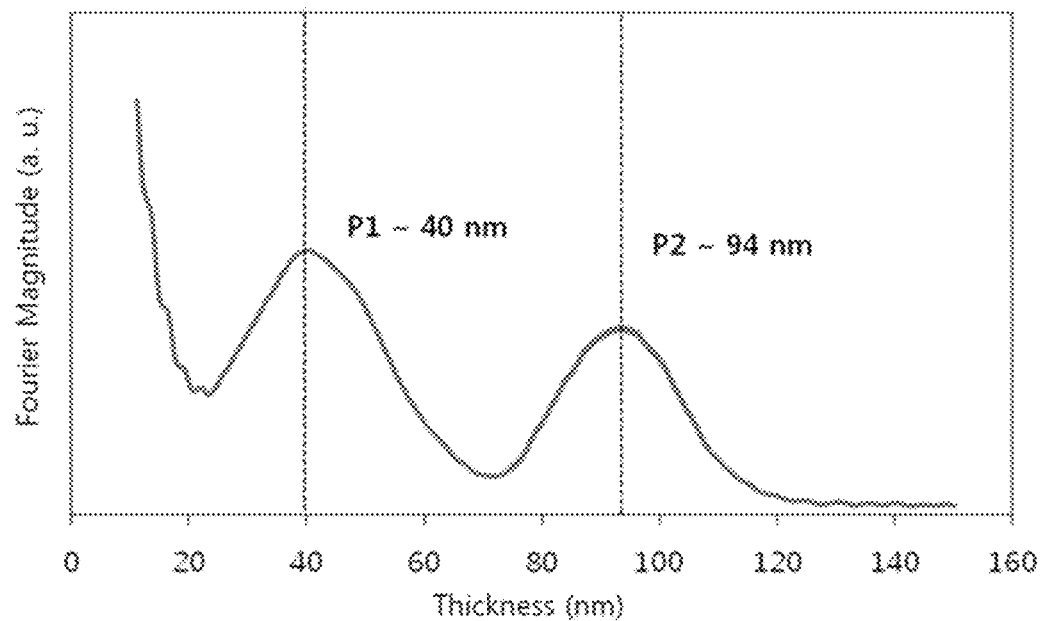
[FIG. 11]
Example 2
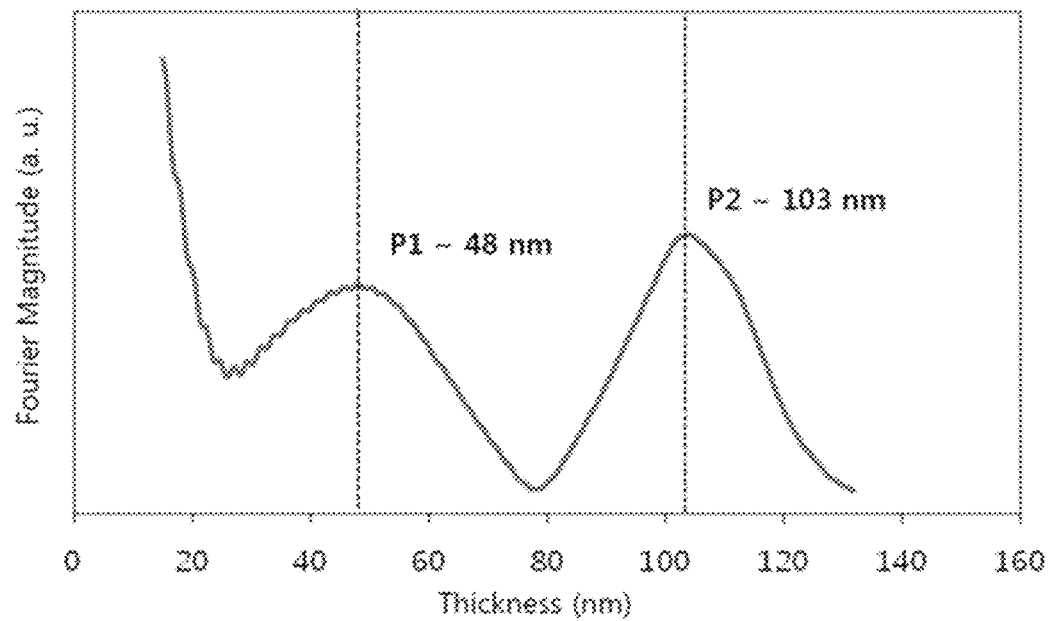

[FIG. 12]
Example 3
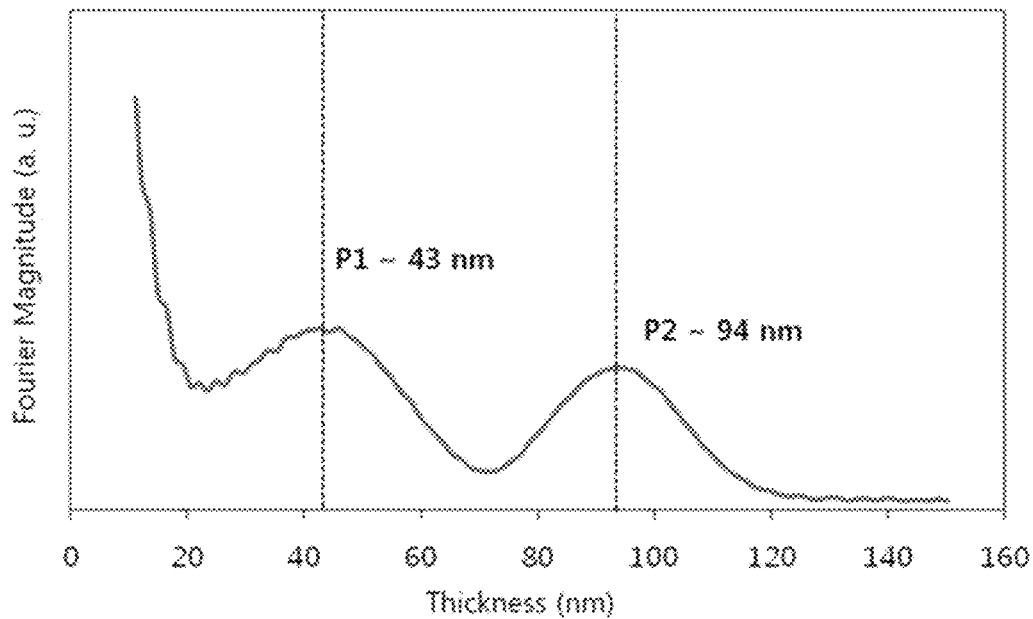
[FIG. 13]
Example 4
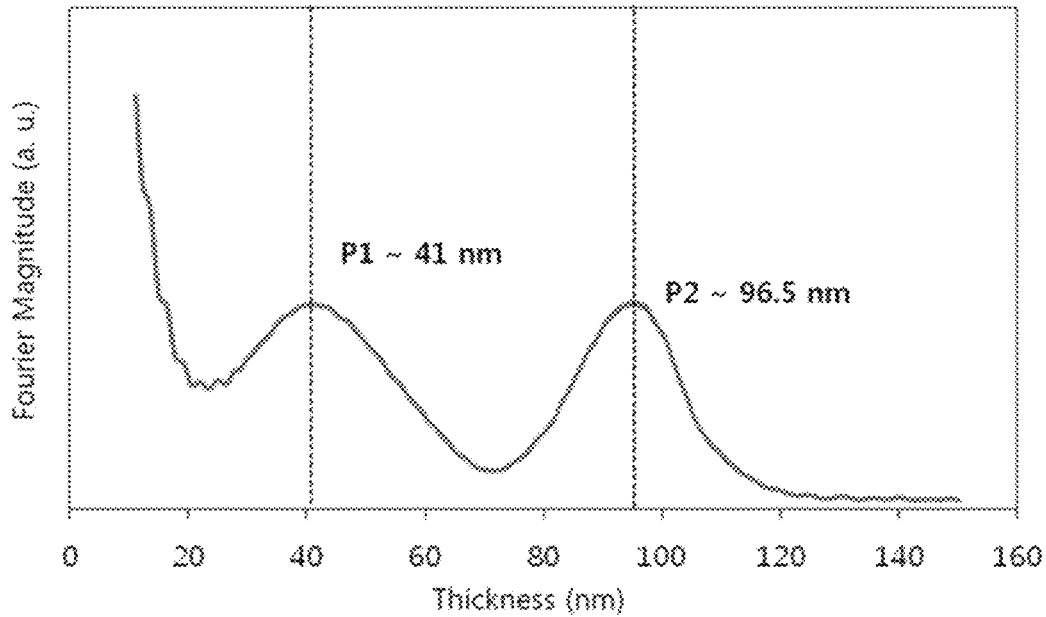

[FIG. 14]
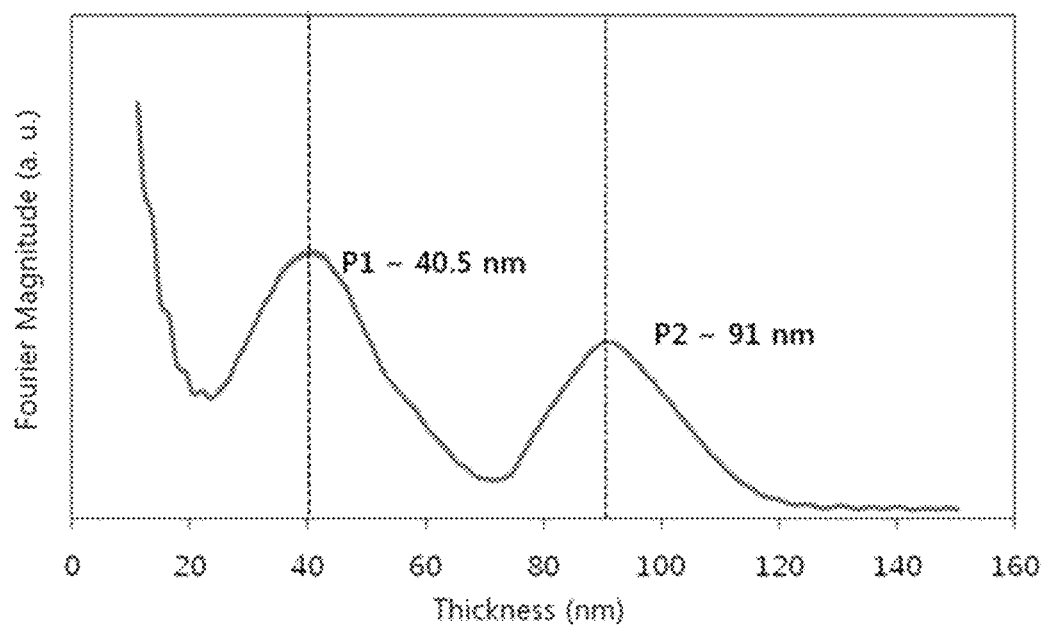
[FIG. 15]
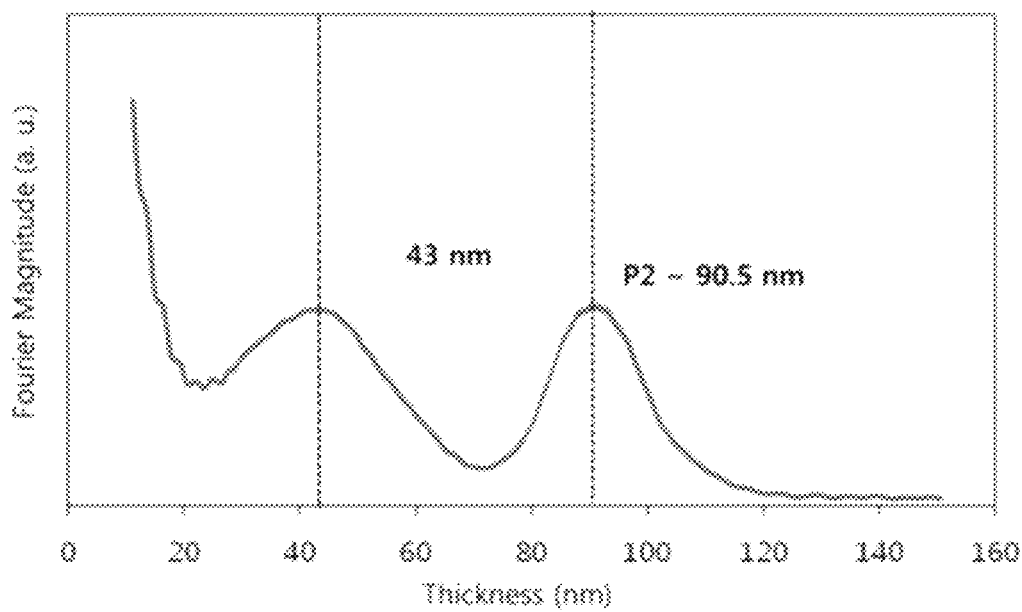

[FIG. 16]
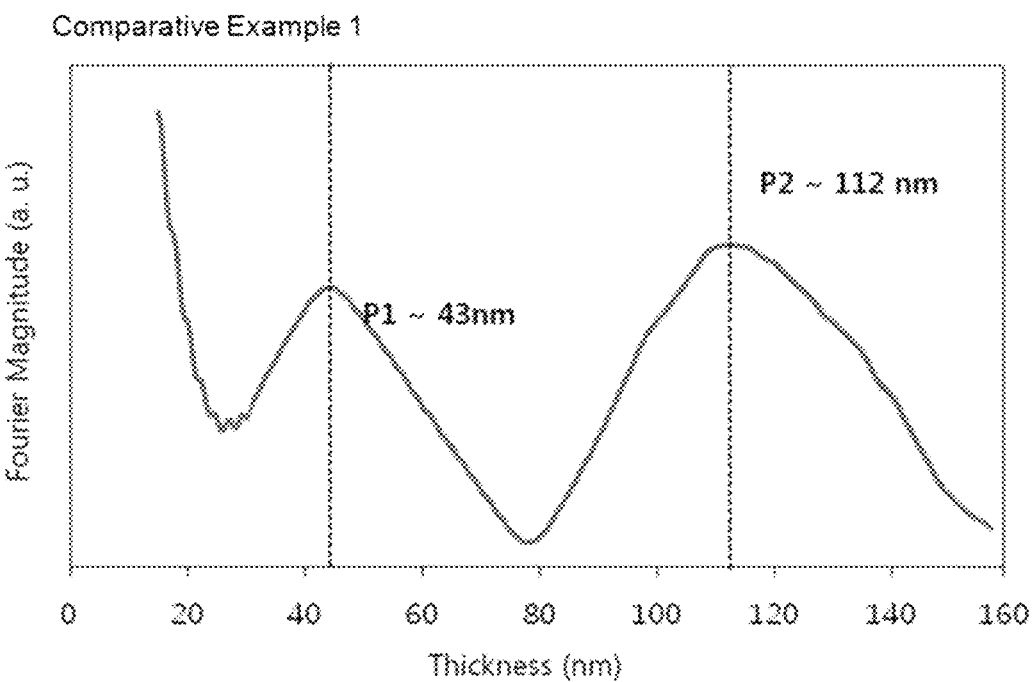
[FIG. 17]
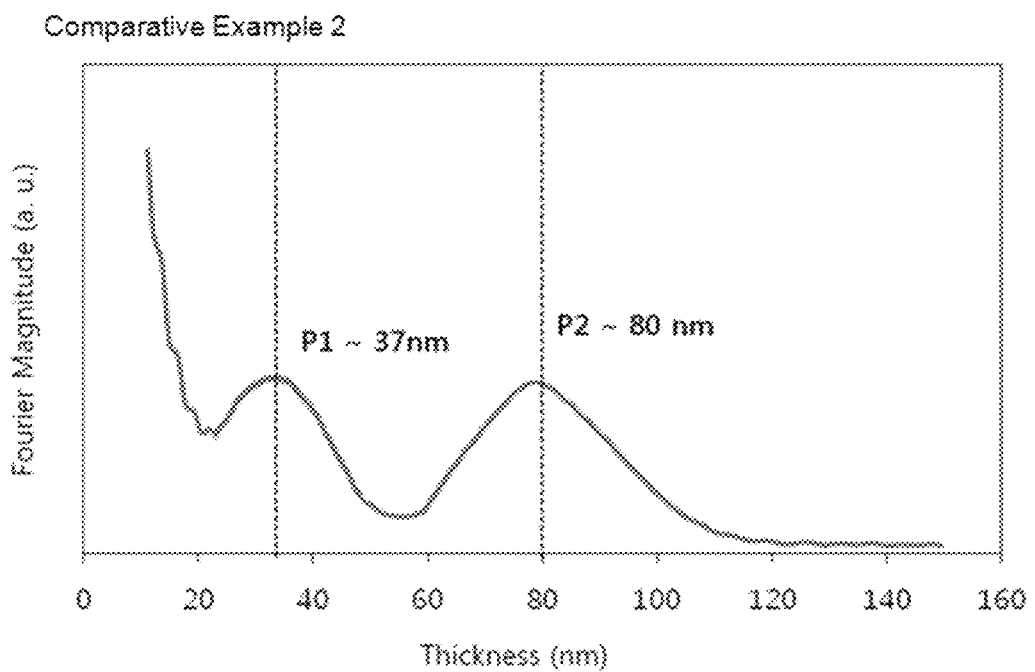

[FIG. 18]
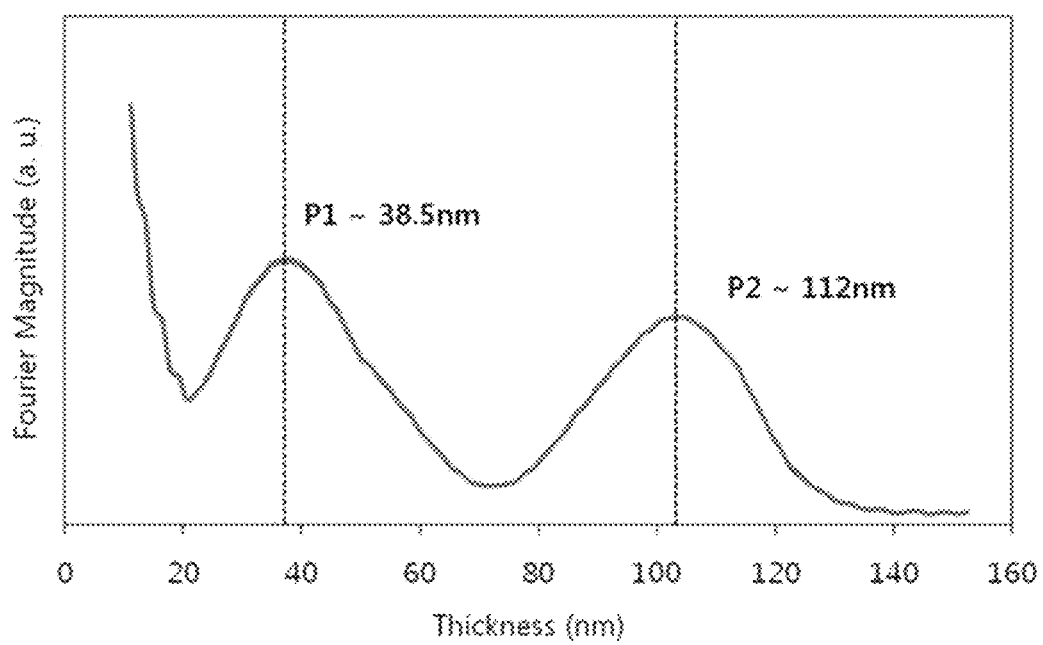

ively increasing the scratch resistance while lowering the reflectivity of the low refractive index layer, and the antifouling property of the surface of the low refractive index layer was greatly reduced due to the particles with a nanometer size.

ANTIREFLECTION FILM

TECHNICAL FIELD

Cross-Reference to Related Application(s)

This application is a 35 U.S.C. § 371 National Phase Entry Application from PCT/KR2017/002580, filed on Mar. 9, 2017, and designating the United States, which claims the benefit of priority from Korean Patent Application No. 10-2016-0028468 filed on Mar. 9, 2016, Korean Patent Application No. 10-2016-0029336 filed on Mar. 11, 2016, Korean Patent Application No. 10-2016-0030395 filed on Mar. 14, 2016 and Korean Patent Application No. 10-2017-0029954 filed on Mar. 9, 2017 with the Korean Intellectual Property Office, the full disclosures of which are incorporated herein by reference in their entirety.

The present invention relates to an antireflection film. More specifically, the present invention relates to an antireflection film that is simultaneously capable of realizing high scratch resistance and antifouling properties while having low reflectivity and high light transmittance, and further capable of enhancing screen sharpness of a display device.

BACKGROUND ART

In general, a flat panel display device such as a PDP or an LCD is equipped with an antireflection film for minimizing the reflection of light incident from the outside.

As methods for minimizing the reflection of light, a method in which a filler such as fine ceramic particles is dispersed in a resin and coated onto a substrate film to impart irregularities (anti-glare (AG) coating); a method of using the interference of light by forming a plurality of layers having different refractive indexes on a substrate film (antireflection (AR) coating); and a method for mixing them, exist.

Among them, in the case of the AG coating, the absolute amount of the reflected light is equivalent to that of a general hard coating, but a low reflection effect can be obtained by reducing the amount of light entering the eye using light scattering through irregularities.

However, since the AG coating has poor screen sharpness due to the surface irregularities, many studies on AR coating have recently been conducted.

As for a film using the AR coating, a multi-layer structure in which a hard coating layer (a high refractive index layer), a low reflective coating layer, and the like are laminated on a substrate film has been commercialized.

However, the method of forming a plurality of layers as described above has disadvantages in that as processes for forming each layer are performed separately, interlayer adhesion force (interfacial adhesion) is weak, and the scratch resistance is low.

In addition, conventionally, in order to improve the scratch resistance of the low refractive index layer included in the antireflection film, a method of adding various particles with a nanometer size (for example, particles of silica, alumina, zeolite, etc.) had been mainly attempted.

However, when the nanometer-sized particles were used as described above, there was a limitation in simultaneously increasing the scratch resistance while lowering the reflectivity of the low refractive index layer, and the antifouling property of the surface of the low refractive index layer was greatly reduced due to the particles with a nanometer size.

Accordingly, many studies have been actively conducted to reduce the absolute reflection amount of light incident from the outside and to improve the antifouling property together with the scratch resistance of the surface, but the degree of improvement in physical properties resulting therefrom is insufficient.

DETAILED DESCRIPTION OF THE INVENTION

Technical Problem

It is one object of the present invention to provide an antireflection film capable of simultaneously realizing high scratch resistance and antifouling properties while having low reflectivity and high light transmittance, and further capable of enhancing screen sharpness of a display device.

Technical Solution

There is provided an antireflection film which exhibits one extremum at a thickness of 35 nm to 55 nm from the surface and exhibits one extremum at a thickness of 85 nm to 105 nm from the surface in a graph showing the result of Fourier transform analysis for the result of X-ray reflectivity measurement using Cu—K-alpha rays.

Hereinafter, the antireflection film according to specific embodiments of the present invention will be described in more detail.

In the present disclosure, the photopolymerizable compound collectively refers to a compound which causes a polymerization reaction when irradiated with light, for example, when irradiated with visible light or ultraviolet light.

Further, the fluorine-containing compound refers to a compound containing at least one fluorine element in the compound.

In addition, the (meth)acryl refers to including both acryl and methacryl.

Moreover, the (co)polymer refers to including both a co-polymer and a homo-polymer.

Furthermore, the hollow inorganic particles refer to silica particles derived from a silicon compound or an organosilicon compound, in which empty voids are present on the surface and/or inside of the silica particles.

According to one embodiment of the present invention, an antireflection film which exhibits one extremum at a thickness of 35 nm to 55 nm from the surface and exhibits one extremum at a thickness of 85 nm to 105 nm from the surface in a graph showing the result of Fourier transform analysis for the result of X-ray reflectivity measurement using Cu—K-alpha rays, may be provided.

Thus, the present inventors conducted intensive studies on the antireflection film, and found through experiments that an antireflection film exhibiting one extremum at a thickness of 35 nm to 55 nm from the surface and exhibiting one extremum at a thickness of 85 nm to 105 nm from the surface in a graph showing the result of Fourier transform analysis for the result of X-ray reflectivity measurement using Cu—K-alpha rays, can simultaneously realize high scratch resistance and antifouling properties while having low reflectivity and high light transmittance, thereby completing the present invention.

Specifically, the graph showing the result of Fourier transform analysis for the result of X-ray reflectivity measurement using Cu—K-alpha rays for the antireflection film represents a Fourier transform magnitude of the y-axis relative to the film thickness of the x-axis.

The extremum of the Fourier transform magnitude is related to a change of the electron density in the thickness direction. When exhibiting the extremum of one Fourier transform magnitude at a thickness of 35 nm to 55 nm from the surface and exhibiting the extremum of one Fourier transform magnitude at a thickness of 85 nm to 105 nm from the surface, it is possible to realize lower reflectivity and to improve the scratch resistance and antifouling properties while two layers having different electron densities are present in the film thickness direction.

Specifically, as the antireflection film exhibits one extremum at a thickness of 35 nm to 55 nm from the surface and exhibits one extremum at a thickness of 85 nm to 105 nm from the surface in a graph showing the result of Fourier transform analysis for the result of X-ray reflectivity measurement using Cu—K-alpha rays, it is possible to maintain the optimized electron density and refractive index distribution inside of the antireflection, thereby realizing lower reflectivity and having a relatively stable structure against scratches or external contaminants.

The extremum means a point which is displayed convexly in the direction of the Fourier transform analysis magnitude of the reflectivity corresponding to the y-axis in the graph showing the result of Fourier transform analysis for the result of X-ray reflectivity measurement using Cu—K-alpha rays for the antireflection film.

More specifically, the extremum means a case in which the function value of "the Fourier transform magnitude of Y-axis relative to the thickness of X-axis" is the largest or the smallest when compared with a periphery function value. For example, it means that a differential value of the function of "the Fourier transform magnitude of Y-axis relative to the thickness of X-axis" is zero.

Further, the extremum may mean a local maximum.

The X-ray reflectivity measurement using Cu—K-alpha rays can be performed for an antireflection film having a size of 1 cm*1 cm (width*length) using Cu—K-alpha rays having a wavelength of 1.5418 Å. Specifically, after adjusting a sample stage so that the 2 theta (2θ) value is 0, the half-cut of the sample is confirmed, and then the reflectivity measurement is performed in a state in which the incident angle and the reflection angle satisfy the specular condition, thereby measuring the X-ray reflectivity pattern.

The Fourier transform analysis of the result of X-ray reflectivity measurement using Cu—K-alpha rays can be performed by using PANalytical's X'Pert Reflectivity program.

Specifically, in the Fourier transform, the input value includes start angle, end angle, and critical angle, and for example, it may enter 0.1° as the start angle, enter 1.2° as the end angle, and 0.163° or 0.18° as the critical angle.

Meanwhile, the characteristics of the antireflection film exhibiting one extremum at a thickness of 35 nm to 55 nm and exhibiting one extremum at a thickness of 85 nm to 105 nm in a graph showing the result of Fourier transform analysis for the result of X-ray reflectivity measurement using Cu—K-alpha rays can be achieved by adjusting the components, optical properties, surface properties, and internal properties of the antireflection film.

The antireflection film of the embodiment may include a generally known detailed configuration. For example, the antireflection film may include a hard coating layer and a low refractive index layer formed on the hard coating layer, and it may further include one or more layers having different properties as required.

Each of the thickness of 35 nm to 55 nm and the thickness of 85 nm to 105 nm from the surface is a thickness defined or measured from the surface of the antireflection film. When the antireflection film includes a hard coating layer and a low refractive index layer formed on the hard coating layer as described above, each of the thickness of 35 nm to 55 nm and the thickness of 85 nm to 105 nm from the surface may be a thickness from the surface of the low refractive index layer.

More specifically, the antireflection film may include a hard coating layer, and a low refractive index layer containing a binder resin and hollow inorganic nanoparticles and solid inorganic nanoparticles dispersed in the binder resin.

Specifically, in the antireflection film, the solid inorganic nanoparticles may be more distributed close to the interface between the hard coating layer and the low refractive index layer, compared to the hollow inorganic nanoparticles.

In the past, inorganic particles were excessively added in order to increase the scratch resistance of the antireflection film, but there was a limitation in enhancing the scratch resistance of the antireflection film, and there was a problem that the reflectivity and the antifouling property were rather lowered.

On the contrary, when the hollow inorganic nanoparticles and the solid inorganic nanoparticles are distributed so as to be distinguished from each other in the low refractive index layer included in the antireflection film, it is preferable in simultaneously realizing high scratch resistance and antifouling properties while having low reflectivity and high light transmittance.

Specifically, when the solid inorganic nanoparticles are mainly distributed close to the interface between the hard coating layer and the low refractive index layer in the low refractive index layer of the antireflection film, and the hollow inorganic nanoparticles are mainly distributed toward the opposite surface of the interface, lower reflectivity can be achieved than actual reflectivity that could be obtained by using the inorganic particles in the past, and the low refractive index layer can achieve greatly improved scratch resistance and antifouling properties.

Further, the characteristics of the antireflection film exhibiting one extremum at a thickness of 35 nm to 55 nm and exhibiting one extremum at a thickness of 85 nm to 105 nm in a graph showing the result of Fourier transform analysis for the result of X-ray reflectivity measurement using Cu—K-alpha rays can be due to the surface or internal properties of the low refractive index layer.

As described above, as the antireflection film exhibits one extremum at a thickness of 35 nm to 55 nm and exhibits one extremum at a thickness of 85 nm to 105 nm in a graph showing the result of Fourier transform analysis for the result of X-ray reflectivity measurement using Cu—K-alpha rays, it is possible to maintain the optimized electron density and refractive index distribution inside of the antireflection film, thereby realizing lower reflectivity and having a relatively stable structure against scratches or external contaminants.

As described above, the low refractive index layer includes a binder resin and hollow inorganic nanoparticles and solid inorganic nanoparticles dispersed in the binder resin, and it may be formed on one surface of the hard coating layer. 70% by volume or more of the entire solid inorganic nanoparticles may be present within 50% of the total thickness of the low refractive index layer from the interface between the hard coating layer and the low refractive index layer.

The "70% by volume or more of the entire solid inorganic nanoparticles is present" in a specific region is defined to mean that, in the cross-section of the low refractive index layer, the solid inorganic nanoparticles are mostly present in the specific region. Specifically, the 70% by volume or more of the entire solid inorganic nanoparticles can be confirmed by measuring the volume of all solid inorganic nanoparticles.

Whether or not the hollow inorganic nanoparticles and the solid inorganic nanoparticles are present in a specific region is determined depending on whether or not each hollow inorganic nanoparticle or solid inorganic nanoparticle exists in the specific region, and it is determined by excluding the particles existing over the interface of the specific region.

Further, as described above, the hollow inorganic nanoparticles can be mainly distributed toward the opposite surface of the interface between the hard coating layer and the low refractive index layer in the low refractive index layer. Specifically, 30% by volume or more, 50% by volume or more, or 70% by volume or more of the entire hollow inorganic nanoparticles may be present at a greater distance in the thickness direction of the low refractive index layer from the interface between the hard coating layer and the low refractive index layer, compared to the solid inorganic nanoparticles.

More specifically, 70% by volume or more of the entire solid inorganic nanoparticles can be present within 30% of the total thickness of the low refractive index layer from the interface between the hard coating layer and the low refractive index layer.

In addition, 70% by volume or more of the entire hollow inorganic nanoparticles may be present in a region exceeding 30% of the total thickness of the low refractive index layer from the interface between the hard coating layer and the low refractive index layer.

As the solid inorganic nanoparticles are mainly distributed close to the interface between the hard coating layer and the low refractive index layer in the low refractive index layer of the antireflection film, and the hollow inorganic nanoparticles are mainly distributed toward the opposite surface of the interface, two or more parts or two or more layers having different refractive indices can be formed in the low refractive index layer, whereby the reflectivity of the antireflection film can be lowered.

The specific distribution of the solid inorganic nanoparticles and the hollow inorganic nanoparticles in the low refractive index layer can be obtained by adjusting the difference in density between the solid inorganic nanoparticles and the hollow inorganic nanoparticles in the specific preparation method described below, and adjusting the drying temperature of the photocurable resin composition for forming a low refractive index layer containing two types of the nanoparticles.

Specifically, the solid inorganic nanoparticles may have a higher density by 0.50 g/cm$^3$ or more compared to the hollow inorganic nanoparticles, and the difference in density between the solid inorganic nanoparticles and the hollow inorganic nanoparticles may be 0.50 g/cm$^3$ to 1.50 g/cm$^3$, or 0.60 g/cm$^3$ to 1.00 g/cm$^3$.

Due to such a difference in density, the solid inorganic nanoparticles may be located closer to the hard coating layer in the low refractive index layer formed on the hard coating layer.

However, as confirmed in the preparation methods and examples described later, despite the difference in density between the two kinds of particles, a predetermined drying temperature and time must be applied in order to realize the distribution pattern of the particles in the low refractive index layer.

When the solid inorganic nanoparticles are mainly distributed close to the interface between the hard coating layer and the low refractive index layer in the low refractive index layer of the antireflection film, and the hollow inorganic nanoparticles are mainly distributed toward the opposite surface of the interface, lower reflectivity can be achieved than the reflectivity that could be obtained by using the inorganic particles in the past.

Specifically, the antireflection film can exhibit average reflectivity of 1.5% or less, 1.0% or less, 0.50 to 1.0%, 0.7% or less, 0.60% to 0.70%, or 0.62% to 0.67% in the visible ray wavelength band region of 380 nm to 780 nm.

Meanwhile, in the antireflection film of the embodiment, the low refractive index layer may include a first layer containing 70% by volume or more of the entire solid inorganic nanoparticles and a second layer containing 70% by volume or more of the entire hollow inorganic nanoparticles, wherein the first layer may be located closer to the interface between the hard coating layer and the low refractive index layer, compared to the second layer.

As described above, in the low refractive index layer of the antireflection film, the solid inorganic nanoparticles are mainly distributed close to the interface between the hard coating layer and the low refractive index layer, the hollow inorganic nanoparticles are mainly distributed toward the opposite surface of the interface, and the regions where each of the solid inorganic nanoparticles and the hollow inorganic nanoparticles are mainly distributed can form an independent layer which is visually confirmed in the low refractive index layer.

In addition, the first layer containing 70% by volume or more of the entire solid inorganic nanoparticles may be located within 50% of the total thickness of the low refractive index layer from the interface between the hard coating layer and the low refractive index layer.

More specifically, the first layer containing 70% by volume or more of the entire solid inorganic nanoparticles can be present within 30% of the total thickness of the low refractive index layer from the interface between the hard coating layer and the low refractive index layer.

Further, as described above, the hollow inorganic nanoparticles can be mainly distributed toward the opposite surface of the interface between the hard coating layer and the low refractive index layer in the low refractive index layer. Specifically, 30% by volume or more, 50% by volume or more, or 70% by volume or more of the entire hollow inorganic nanoparticles may be present at a greater distance in the thickness direction of the low refractive index layer from the interface between the hard coating layer and the low refractive index layer, compared to the solid inorganic nanoparticles.

Consequently, as described above, the first layer can be located closer to the interface between the hard coating layer and the low refractive index layer compared to the second layer.

Further, as described above, it can be visually confirmed that each of the first layer and the second layer, which is a region where each of the solid inorganic nanoparticles and the hollow inorganic nanoparticles are mainly distributed, is present in the refractive layer.

For example, it can be visually confirmed that each of the first layer and the second layer is present in the refractive index layer using a transmission electron microscope, a scanning electron microscope, or the like. The ratio between the solid inorganic nanoparticles and the hollow inorganic nanoparticles distributed in each of the first layer and the second layer in the refractive layer can also be confirmed.

On the other hand, each of the first layer containing 70% by volume or more of the entire solid inorganic nanoparticles and the second layer containing 70% by volume or more of the entire hollow inorganic nanoparticles can share a common optical property in a single layer, and thus it can be defined as one layer.

More specifically, when the polarization ellipticity measured by an ellipsometry method is fitted to a Cauchy model of the following General Formula 1, each of the first layer and the second layer has specific Cauchy parameters A, B, and C, and thus the first layer and the second layer can be distinguished from each other.

Also, since the thicknesses of the first layer and the second layer can be derived by fitting the polarization ellipticity measured by an ellipsometry method to a Cauchy model of the following General Formula 1, the first layer and the second layer in the low refractive index layer can be defined.

$$n(\lambda) = A + \frac{B}{\lambda^2} + \frac{C}{\lambda^4}$$ [General Formula 1]

Herein, in the above General Formula 1, $n(\lambda)$ is a refractive index at a wavelength $\lambda$, $\lambda$ is in a range of 300 nm to 1800 nm, and A, B, and C are Cauchy parameters.

On the other hand, when the polarization ellipticity measured by an ellipsometry method is fitted to a Cauchy model of General Formula 1, the derived Cauchy parameters A, B, and C may be an average value in a single layer.

Thereby, when an interface is present between the first layer and the second layer, a region where the Cauchy parameters A, B, and C of the first layer and the second layer overlap may exist.

However, even in this case, the thickness and the position of the first layer and the second layer can be specified depending on the region that satisfies the average value of Cauchy parameters A, B, and C of each of the first layer and the second layer.

For example, when the polarization ellipticity measured by an ellipsometry method is fitted to a Cauchy model of General Formula 1 for the first layer included in the low reflective index layer, it can satisfy the condition that A is 1.0 to 1.65, B is 0.0010 to 0.0350, and C is 0 to $1*10^{-3}$. Also, with respect to the first layer included in the low refractive index layer, it can satisfy the condition that, while A is 1.30 to 1.55, 1.40 to 1.52, or 1.491 to 1.511, and while B is 0 to 0.005, 0 to 0.00580, or 0 to 0.00573, C is 0 to $1*10^{-3}$, 0 to $5.0*10^{-4}$, or 0 or $4.1352*10^{-4}$.

In addition, when the polarization ellipticity measured by an ellipsometry method is fitted to a Cauchy model of General Formula 1 for the second layer included in the low reflective index layer, it can satisfy the condition that A is 1.0 to 1.50, B is 0 to 0.007, and C is 0 to $1*10^{-3}$. Also, with respect to the second layer included in the low refractive index layer, it can satisfy the condition that, while A is 1.10 to 1.40, 1.20 to 1.35, or 1.211 to 1.349, and while B is 0 to 0.007, 0 to 0.00550, or 0 to 0.00513, C is 0 to $1*10^{-3}$, 0 to $5.0*10^{-4}$, or 0 to $4.8685*10^{-4}$.

On the other hand, in the antireflection film of the embodiment(s) described above, the first layer and the second layer included in the low refractive index layer may have different refractive index ranges.

More specifically, the first layer included in the low refractive index layer may have a refractive index of 1.420 to 1.600, 1.450 to 1.550, 1.480 to 1.520, or 1.491 to 1.511 at 550 mm.

Further, the second layer included in the low refractive index layer may have a refractive index of 1.200 to 1.410, 1.210 to 1.400, or 1.211 to 1.375 at 550 mm.

The measurement of the above-described refractive index can be performed by using a conventionally known method. For example, it may be determined by calculating the polarization ellipticity measured at a wavelength of 380 nm to 1000 nm and the refractive index at a wavelength of 550 nm using a Cauchy model for each of the first layer and the second layer included in the low refractive index layer.

On the other hand, the solid inorganic nanoparticles mean particles having a maximum diameter of less than 100 nm, and having a form in which voids are not present therein.

Further, the hollow inorganic nanoparticles mean particles having an average diameter of less than 200 nm and having a form in which voids are present on the surface and/or inside thereof.

The solid inorganic nanoparticles may have a diameter of 0.5 to 100 nm, or 1 to 30 nm.

The hollow inorganic nanoparticles may have a diameter of 1 to 200 nm, or 10 to 100 nm.

The diameter of the solid inorganic nanoparticles and the hollow inorganic nanoparticles can mean the longest diameter as confirmed in the cross-section of the particles.

Meanwhile, each of the solid inorganic nanoparticles and the hollow inorganic nanoparticles may have at least one reactive functional group selected from the group consisting of a (meth)acrylate group, an epoxide group, a vinyl group, and a thiol group on the surface thereof.

As each of the solid inorganic nanoparticles and the hollow inorganic nanoparticles contain the above-described reactive functional group on the surface, the low refractive layer can have a higher degree of crosslinking, thereby securing more improved scratch resistance and antifouling properties.

Meanwhile, the above-described low refractive index layer can be produced from a photocurable coating composition containing a photopolymerizable compound, a fluorine-containing compound containing a photoreactive functional group, hollow inorganic nanoparticles, solid inorganic nanoparticles, and a photoinitiator.

Accordingly, the binder resin contained in the low refractive index layer may include a crosslinked (co)polymer between a (co)polymer of a photopolymerizable compound and a fluorine-containing compound containing a photoreactive functional group.

The photopolymerizable compound contained in the photocurable coating composition of this embodiment can form a substrate of the binder resin of the low refractive index layer to be produced.

Specifically, the photopolymerizable compound may include a monomer or an oligomer including a (meth)acrylate or a vinyl group.

More specifically, the photopolymerizable compound may include a monomer or an oligomer containing one or more, two or more, or three or more (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta (meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof.

Herein, the molecular weight of the oligomers is preferably 1000 to 10,000.

Specific examples of the monomer or oligomer containing a vinyl group may include divinylbenzene, styrene, and para-methyl styrene.

The content of the photopolymerizable compound in the photocurable coating composition is not particularly limited. However, considering the mechanical properties of the finally produced low refractive index layer or antireflection film, the content of the photopolymerizable compound in the solid content of the photocurable coating composition may be 5% by weight to 80% by weight.

The solid content of the photocurable coating composition means only a solid component, excluding a liquid component in the photocurable coating composition, for example, a component such as an organic solvent which may be optionally included as described below.

On the other hand, the photopolymerizable compound may further include a fluorine-based (meth)acrylate-based monomer or oligomer in addition to the monomer or oligomer described above.

When the fluorine-based (meth)acrylate-based monomer or oligomer is further included, the weight ratio of the fluorine-based (meth)acrylate-based monomer or oligomer to the monomer or oligomer containing a (meth)acrylate or vinyl group may be 0.1% to 10%.

Specific examples of the fluorine-based (meth)acrylate-based monomer or oligomer may include at least one compound selected from the group consisting of the following Chemical Formulae 1 to 5.

[Chemical Formula 1]

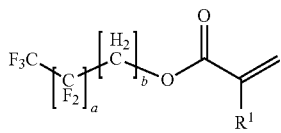

In the above formula 1, $R^1$ is a hydrogen group, or an alkyl group having 1 to 6 carbon atoms, a is an integer of 0 to 7, and b is an integer of 1 to 3.

[Chemical Formula 2]

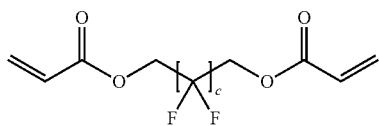

In the above formula 2, c is an integer of 1 to 10.

[Chemical Formula 3]

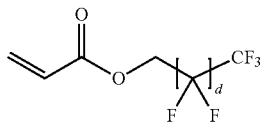

In the above formula 3, d is an integer of 1 to 11.

[Chemical Formula 4]

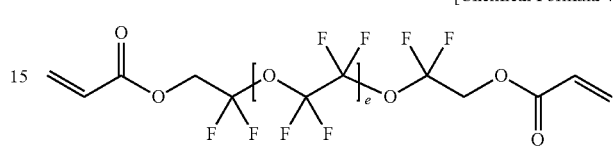

In the above formula 4, e is an integer of 1 to 5.

[Chemical Formula 5]

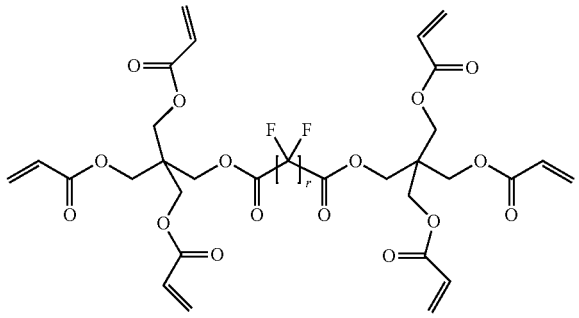

In the above formula 5, f is an integer of 4 to 10.

On the other hand, the low refractive index layer may include a portion derived from the fluorine-containing compound containing the photoreactive functional group.

One or more photoreactive functional groups may be contained or substituted in the fluorine-containing compounds containing a photoreactive functional group. The photoreactive functional group means a functional group capable of participating in the polymerization reaction by irradiation with light, for example, by irradiation with visible light or ultraviolet light.

The photoreactive functional group may include various functional groups known to be capable of participating in the polymerization reaction by irradiation with light. Specific examples thereof include a (meth)acrylate group, an epoxide group, a vinyl group, and a thiol group.

Each of the fluorine-containing compounds containing the photoreactive functional group may have a weight average molecular weight (weight average molecular weight in terms of polystyrene measured by GPC method) of 2000 to 200,000, preferably 5000 to 100,000.

If the weight average molecular weight of the fluorine-containing compound containing the photoreactive functional group is too small, the fluorine-containing compound in the photocurable coating composition cannot be uniformly and effectively arranged on the surface and is located inside the low refractive index layer that is finally produced. Thus, the antifouling property that the surface of the low refractive index has is lowered and the crosslinking density of the low refractive index layer is lowered, so that the overall mechanical properties such as the strength and the scratch resistance may be deteriorated.

In addition, if the weight average molecular weight of the fluorine-containing compound containing the photoreactive functional group is too high, the compatibility with other components in the photocurable coating composition may be lowered, and thus the haze of the low refractive index layer that is finally produced may be increased or the light transmittance may be lowered, and the strength of the low refractive index layer may also be lowered.

Specifically, the fluorine-containing compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The photocurable coating composition may contain 20 to 300 parts by weight of the fluorine-containing compound containing the photoreactive functional group based on 100 parts by weight of the photopolymerizable compound.

When the fluorine-containing compound containing the photoreactive functional group is excessively added relative to the photopolymerizable compound, the coating property of the photocurable coating composition of the embodiment may be lowered, or the low refractive index layer obtained from the photocurable coating composition may not have sufficient durability or scratch resistance.

Further, when the amount of the fluorine-containing compound containing the photoreactive functional group is too small relative to the photopolymerizable compound, the low refractive index layer obtained from the photocurable coating composition may not have mechanical properties such as sufficient antifouling property and scratch resistance.

The fluorine-containing compound containing the photoreactive functional group may further contain silicon or a silicon compound.

That is, the fluorine-containing compound containing a photoreactive functional group can optionally contain silicon or a silicon compound therein. Specifically, the content of silicon in the fluorine-containing compound containing the photoreactive functional group may be 0.1% by weight to 20% by weight.

The silicon contained in the fluorine-containing compounds containing the photoreactive functional group can increase the compatibility with other components contained in the photocurable coating composition of the embodiment, whereby it can prevent the generation of haze on the finally produced refractive layer and serve to enhance transparency.

On the other hand, if the content of silicon in the fluorine-containing compounds containing the photoreactive functional group is too large, compatibility between the other components contained in the photocurable coating composition and the fluorine-containing compound may be rather lowered, whereby the finally produced low refractive index layer and antireflection film may not have sufficient light transmittance and antireflection performance, and thus the antifouling property of the surface may also be lowered.

The low refractive index layer may include 10 to 400 parts by weight of the hollow inorganic nanoparticles and 10 to 400 parts by weight of the solid inorganic nanoparticles, relative to 100 parts by weight of the (co)polymer of the photopolymerizable compound.

When the content of the hollow inorganic nanoparticles and the solid inorganic nanoparticles in the low refractive index layer is excessively large, in the process of preparing the low refractive index layer, the phase separation between the hollow inorganic nanoparticles and the solid inorganic nanoparticles does not sufficiently occur and they are mixed, so that the reflectivity can be increased, and further the surface irregularities can be excessively generated and thus the antifouling property can be lowered.

Further, when the content of the hollow inorganic nanoparticles and the solid inorganic nanoparticles in the low refractive index layer is excessively small, it may be difficult for a majority of the solid inorganic nanoparticles to be located in a region close to the interface between the hard coating layer and the low refractive index layer, and the reflectivity of the low refractive index layer can be greatly increased.

The low refractive index layer may have a thickness of 1 nm to 300 nm, or 50 nm to 200 nm, or 85 nm to 300 nm.

Meanwhile, as the hard coating layer, one that is commonly known in the art can be used without particular limitation.

As an example of the hard coating film, one including a binder resin containing a photocurable resin and organic or inorganic fine particles dispersed in the binder resin may be mentioned.

The photocurable resin contained in the hard coating layer may be a polymer of a photocurable compound capable of causing a polymerization reaction when irradiated with light such as ultraviolet light or the like, and may be one that is conventional in the relevant art.

Specifically, the photocurable resin may include at least one selected from a reactive acrylate oligomer group consisting of a urethane acrylate oligomer, an epoxide acrylate oligomer, a polyester acrylate, and a polyether acrylate; and a polyfunctional acrylate monomer consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethyl propane ethoxy triacrylate, 1,6-hexanediol diacrylate, propoxylated glycerol triacrylate, tripropylene glycol diacrylate, and ethylene glycol diacrylate.

The particle size of the organic or inorganic fine particles is not specifically limited, but for example, the organic fine particles may have a particle diameter of 1 to 10 μm, and the inorganic particles may have a particle diameter of 1 nm to 500 nm, or 1 nm to 300 nm.

The particle diameter of the organic or inorganic fine particles may be defined as a volume average particle diameter.

In addition, specific examples of the organic or inorganic fine particles contained in the hard coating film are not limited, but for example, the organic or inorganic fine particles may be an organic fine particle composed of an acrylic-based resin, a styrene-based resin, an epoxide resin, and a nylon resin, or an inorganic fine particle composed of silicon oxide, titanium dioxide, indium oxide, tin oxide, zirconium oxide, and zinc oxide.

The binder resin of the hard coating layer may further include a high molecular weight (co)polymer having a weight average molecular weight of 10,000 or more.

The high molecular weight (co)polymer may be at least one selected from the group consisting of a cellulose-based polymer, an acrylic-based polymer, a styrene-based polymer, an epoxide-based polymer, a nylon-based polymer, a urethane-based polymer, and a polyolefin-based polymer.

On the other hand, as another example of the hard coating film, a hard coating film including a binder resin of a photocurable resin and an antistatic agent dispersed in the binder resin may be mentioned.

The photocurable resin contained in the hard coating layer may be a polymer of a photocurable compound capable of causing a polymerization reaction when irradiated with light such as ultraviolet light or the like, and may be one that is conventional in the relevant art.

However, preferably, the photocurable compound may be a polyfunctional (meth)acrylate-based monomer or oligomer. In this case, it is advantageous for the number of (meth)acrylate-based functional groups to be 2 to 10, preferably 2 to 8, and more preferably, 2 to 7, in terms of securing the physical properties of the hard coating layer.

More preferably, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be quaternary ammonium salt compounds; pyridinium salts; cationic compounds having 1 to 3 amino groups; anionic compounds such as a sulfonic acid base, a sulfuric ester base, a phosphoric ester base, a phosphonic acid base, and the like; amphoteric compounds such as amino acid-based or aminosulfuric acid ester-based compounds; nonionic compounds such as imino alcohol-based compounds, glycerin-based compounds, polyethylene glycol-based compounds, and the like; organometallic compounds such as metal alkoxide compounds including tin, titanium, or the like; metal chelate compounds such as an acetylacetonate salt of the organometallic compounds; two or more reactants or polymers of these compounds; and a mixture of two or more of these compounds.

Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used.

The conductive polymer may include aromatic conjugated poly(paraphenylene), heterocyclic conjugated polypyrrole, polythiophene, aliphatic conjugated polyacetylene, a conjugated polyaniline containing a hetero atom, a mixed-type conjugated poly(phenylene vinylene), a conjugated double-chain type conjugated compound having a plurality of conjugated chains in the molecule, a conductive complex obtained by graft or block copolymerization of a conjugated polymer chain with a saturated polymer, and the like.

Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film including a binder resin of the photocurable resin; and an antistatic agent dispersed in the binder resin may further include at least one compound selected from the group consisting of an alkoxysilane-based oligomer and a metal alkoxide-based oligomer.

The alkoxysilane-based compound may be one that is conventional in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer.

However, since the metal alkoxide-based compound can rapidly react with water, the sol-gel reaction can be performed by a method of diluting the metal alkoxide-based compound in an organic solvent and then slowly dripping water.

At this time, considering the reaction efficiency or the like, the molar ratio (based on metal ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The hard coating film may have a thickness of 0.1 µm to 100 µm.

A substrate bonded to the other surface of the hard coating layer can be further included.

The specific type and thickness of the substrate are not particularly limited, and any substrate known to be usable in the production of a low refractive index layer or antireflection film may be used without particular limitation.

On the other hand, the antireflection film according to the embodiment may be provided through a method for preparing the antireflection film including the steps of: coating a resin composition for forming a low refractive index layer containing a photocurable compound or its (co)polymer, a fluorine-containing compound containing a photoreactive functional group, a photoinitiator, a hollow inorganic nanoparticle, and a solid inorganic nanoparticle onto the hard coating layer and drying the coated resin composition at a temperature of 35° C. to 100° C.; and photocuring the dried product of the resin composition.

Specifically, the antireflection film provided by the method for preparing an antireflection film is configured such that the hollow inorganic nanoparticles and the solid inorganic nanoparticles are distributed so as to be distinguishable from each other in the low refractive index layer, and thereby it can simultaneously realize high scratch resistance and antifouling properties while having low reflectivity and high light transmittance.

More specifically, the antireflection film includes a hard coating layer; and a low refractive index layer containing a binder resin, and hollow inorganic nanoparticles and solid inorganic nanoparticles dispersed in the binder resin, wherein 70% or more by volume of the entire solid inorganic nanoparticles may be present within 50% of the total thickness of the low refractive index layer from the interface between the hard coating layer and the low refractive index layer.

Further, 30% by volume or more of the entire hollow inorganic nanoparticles may be present at a greater distance in the thickness direction of the low refractive index layer from the interface between the hard coating layer and the low refractive index layer, compared to the solid inorganic nanoparticles.

Further, 70% by volume or more of the entire solid inorganic nanoparticles may be present within 30% of the total thickness of the low refractive index layer from the interface between the hard coating layer and the low refractive index layer.

In addition, 70% by volume or more of the entire hollow inorganic nanoparticles may be present in a region exceeding 30% of the total thickness of the low refractive index layer from the interface between the hard coating layer and the low refractive index layer.

Further, in the antireflection film provided by the method for preparing an antireflection film, the low refractive index layer may include a first layer containing 70% by volume or more of the entire solid inorganic nanoparticles and a second layer containing 70% by volume or more of the entire hollow inorganic nanoparticles, wherein the first layer may be located closer to the interface between the hard coating layer and the low refractive index layer, compared to the second layer.

The low refractive index layer may be formed by coating a resin composition for forming a low refractive index layer containing a photocurable compound or its (co)polymer, a fluorine-containing compound containing a photoreactive functional group, a photoinitiator, a hollow inorganic nanoparticle, and a solid inorganic nanoparticle on the hard coating layer, and drying the coated resin composition at a temperature of 35° C. to 100° C., or 40° C. to 80° C.

If the temperature for drying the resin composition for forming a low refractive index layer coated on the hard coating layer is less than 35° C., the antifouling property of the low refractive index layer formed as described above may be greatly lowered.

Further, if the temperature for drying the resin composition for forming a low refractive index layer coated on the hard coating layer is greater than 100° C., in the process of preparing the low refractive index layer, the phase separation between the hollow inorganic nanoparticles and the solid inorganic nanoparticles does not sufficiently occur and they are mixed, so that the scratch resistance and antifouling properties of the low refractive index layer are lowered and also the reflectivity can also be greatly increased.

By adjusting the difference in density between the solid inorganic nanoparticles and the hollow inorganic nanoparticles together with the drying temperature, in the process of drying the resin composition for forming a low refractive index layer coated on the hard coating layer, a low refractive index layer having the above-described characteristics can be formed. The solid inorganic nanoparticles can have density that is higher by 0.50 g/cm$^3$ or more compared to the hollow inorganic nanoparticles, and due to such a difference in density, the solid inorganic nanoparticles may be located closer to the hard coating layer in the low refractive index layer formed on the hard coating layer.

Specifically, the solid inorganic nanoparticles may have a density of 2.00 g/cm$^3$ to 4.00 g/cm$^3$, and the hollow inorganic nanoparticles may have a density of 1.50 g/cm$^3$ to 3.50 g/cm$^3$.

Meanwhile, the step of drying the resin composition for forming a low refractive index layer coated on the hard coating layer at a temperature of 35° C. to 100° C. may be performed for 10 seconds to 5 minutes, or 30 seconds to 4 minutes.

If the drying time is too short, the phase separation phenomenon between the solid inorganic nanoparticles and the hollow inorganic nanoparticles described above may not sufficiently occur. On the contrary, if the drying time is too long, the formed low refractive index layer may corrode the hard coating layer.

Meanwhile, the low refractive index layer can be produced from a photocurable coating composition containing a photopolymerizable compound or a (co)polymer thereof, a fluorine-containing compound containing a photoreactive functional group, hollow inorganic nanoparticles, solid inorganic nanoparticles, and a photoinitiator.

The low refractive index layer can be obtained by coating the photocurable coating composition onto a predetermined substrate and photocuring the coated product.

The specific type and thickness of the substrate are not particularly limited, and a substrate known to be used in the production of the low refractive index layer or the antireflection film can be used without particular limitation.

The method and apparatus commonly used for coating the photocurable coating composition can be used without particular limitation. For example, a bar coating method, such as a Meyer bar method or the like, a gravure coating method, a 2-roll reverse coating method, a vacuum slot die coating method, a 2-roll coating method, or the like can be used.

The low refractive index layer may have a thickness of 1 nm to 300 nm, or 50 nm to 200 nm.

Thus, the thickness of the photocurable coating composition coated onto the predetermined substrate can be about 1 nm to 300 nm, or 50 nm to 200 nm.

In the step of photocuring the photocurable coating composition, ultraviolet light or visible light having a wavelength of 200 nm to 400 nm can be irradiated, and the amount of exposure is preferably 100 mJ/cm$^2$ to 4000 mJ/cm$^2$.

The exposure time is not particularly limited, and can be appropriately varied depending on the exposure apparatus used, the wavelength of the irradiated light, or the amount of exposure.

Further, in the step of photocuring the photocurable coating composition, nitrogen purging or the like may be performed to apply nitrogen atmosphere conditions.

Specific contents of the photocurable compound, the hollow inorganic nanoparticles, the solid inorganic nanoparticles, and the fluorine-containing compounds containing the photoreactive functional group may include those given above in the antireflection film of the embodiments.

Each of the hollow inorganic particles and the solid inorganic nanoparticles may be contained in the composition as a colloidal phase dispersed in a predetermined dispersion medium.

The respective colloidal phases including the hollow inorganic particles and the solid inorganic nanoparticles may include an organic solvent as a dispersion medium.

The colloidal content of each of the hollow inorganic nanoparticles and the solid inorganic nanoparticles can be determined in consideration of the respective content ranges of the hollow inorganic nanoparticles and the solid inorganic nanoparticles in the photocurable coating composition, the viscosity of the photocurable coating composition, and the like. For example, the solid content of each of the hollow inorganic nanoparticles and the solid inorganic nanoparticles in the colloidal phase may be 5% by weight to 60% by weight.

Herein, examples of the organic solvent in the dispersion medium include alcohols such as methanol, isopropyl alcohol, ethylene glycol, butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

As the photopolymerization initiator, any compound known to be usable in a photocurable resin composition may be used without particular limitation. Specifically, a benzophenone-based compound, an acetophenone-based based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

If the amount of the photopolymerization initiator is too small, the photopolymerization initiator may not be cured in the photocuring step of the photocurable coating composition to generate a residual material.

If the amount of the photopolymerization initiator is too large, the unreacted initiator may remain as impurities or the crosslinking density may be lowered, and thus the mechanical properties of the resulting film may be deteriorated, or the reflectivity may be greatly increased.

Meanwhile, the photocurable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, and isobutyl ketone; alcohols such as methanol, ethanol, diacetone alcohol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or a mixture of two or more thereof.

The organic solvent may be added at the time of mixing the respective components contained in the photocurable coating composition, or may be added to the photocurable coating composition while the respective components are added in a state of being dispersed or mixed in the organic solvent.

If the content of the organic solvent in the photocurable coating composition is too small, the flowability of the photocurable coating composition may be reduced, resulting in defects such as generation of stripes in the finally produced film, or the like.

Further, if the organic solvent is added in an excessive amount, the solid content is lowered, the physical properties and surface properties of the film may be deteriorated due to insufficient coating and film formation, and defects may occur during the drying and curing processes.

Accordingly, the photocurable coating composition may include an organic solvent such that the concentration of the total solids of the components contained becomes 1% by weight to 50% by weight, or 2% by weight to 20% by weight.

The hard coating layer can be used without particular limitation as long as it is a material known to be usable for the antireflection film.

Specifically, the preparation method of the antireflection film further includes coating a polymer resin composition for forming a hard coating layer including a photocurable compound or a (co)polymer thereof, a photoinitiator, and an antistatic agent on the substrate, and photocuring the coated product.

The components used for forming the hard coating layer are the same as those described above with respect to the antireflection film of one embodiment.

Further, the resin composition for forming the hard coating layer may further include at least one compound selected from the group consisting of an alkoxysilane-based oligomer and a metal alkoxide-based oligomer.

The method and apparatus commonly used for coating the resin composition for forming the hard coating layer can be used without particular limitation. For example, a bar coating method, such as a Meyer bar method or the like, a gravure coating method, a 2-roll reverse coating method, a vacuum slot die coating method, a 2-roll coating method, or the like can be used.

In the step of photocuring the polymer resin composition for forming the hard coating layer, ultraviolet light or visible light having a wavelength of 200 nm to 400 nm can be irradiated, and the amount of exposure is preferably 100 mJ/cm$^2$ to 4000 mJ/cm$^2$.

The exposure time is not particularly limited, and can be appropriately varied depending on the exposure apparatus used, the wavelength of the irradiated light, or the amount of exposure.

Further, in the step of photocuring the photocurable coating composition for forming the hard coating layer, nitrogen purging or the like may be performed.

Advantageous Effects

According to the present invention, an antireflection film capable of simultaneously realizing high scratch resistance and antifouling properties while having low reflectivity and high light transmittance, and further capable of enhancing screen sharpness of a display device, and a method for preparing the antireflection film, may be provided.

BRIEF DESCRIPTION OF THE DRAWINGS

FIG. 1 shows a cross-sectional TEM photograph of the antireflection film of Example 1.

FIG. 2 shows a cross-sectional TEM photograph of the antireflection film of Example 2.

FIG. 3 shows a cross-sectional TEM photograph of the antireflection film of Example 3.

FIG. 4 shows a cross-sectional TEM photograph of the antireflection film of Example 4.

FIG. 5 shows a cross-sectional TEM photograph of the antireflection film of Example 5.

FIG. 6 shows a cross-sectional TEM photograph of the antireflection film of Example 6.

FIG. 7 shows a cross-sectional TEM photograph of the antireflection film of Comparative Example 1.

FIG. 8 shows a cross-sectional TEM photograph of the antireflection film of Comparative Example 2.

FIG. 9 shows a cross-sectional TEM photograph of the antireflection film of Comparative Example 3.

FIG. 10 is a graph showing the result of Fourier transform analysis for the result of X-ray reflectivity measurement using Cu—K-alpha rays for the antireflection film of Example 1.

FIG. 11 is a graph showing the result of Fourier transform analysis for the result of X-ray reflectivity measurement using Cu—K-alpha rays for the antireflection film of Example 2.

FIG. 12 is a graph showing the result of Fourier transform analysis for the result of X-ray reflectivity measurement using Cu-Kα rays for the antireflection film of Example 3.

FIG. 13 is a graph showing the result of Fourier transform analysis for the result of X-ray reflectivity measurement using Cu—K-alpha rays for the antireflection film of Example 4.

FIG. 14 is a graph showing the result of Fourier transform analysis for the result of X-ray reflectivity measurement using Cu—K-alpha rays for the antireflection film of Example 4.

FIG. 15 is a graph showing the result of Fourier transform analysis for the result of X-ray reflectivity measurement using Cu—K-alpha rays for the antireflection film of Example 6.

FIG. 16 is a graph showing the result of Fourier transform analysis for the result of X-ray reflectivity measurement using Cu—K-alpha rays for the antireflection film of Comparative Example 1.

FIG. 17 is a graph showing the result of Fourier transform analysis for the result of X-ray reflectivity measurement using Cu—K-alpha rays for the antireflection film of Comparative Example 2.

FIG. 18 is a graph showing the result of Fourier transform analysis for the result of X-ray reflectivity measurement using Cu—K-alpha rays for the antireflection film of Comparative Example 2.

DETAILED DESCRIPTION OF THE EMBODIMENTS

The present invention will be described in more detail by way of examples.

However, the following examples are for illustrative purposes only and are not intended to limit the scope of the present invention thereto.

PREPARATION EXAMPLE

Preparation Example: Preparation of Hard Coating Layer

A salt type of antistatic hard coating solution (manufactured by KYOEISHA Chemical, solid content: 50 wt %, product name: LJD-1000) was coated onto triacetyl cellulose film with a #10 Meyer bar, dried at 90° C. for 1 minute, and then irradiated with ultraviolet light of 150 mJ/cm$^2$ to prepare a hard coating film having a thickness of about 5 to 6 μm.

Examples 1 to 5: Preparation of Antireflection Film

Examples 1 to 4

(1) Preparation of a Photocurable Coating Composition for Preparing a Low Refractive Index Layer Based on 100 parts by weight of pentaerythritol triacrylate (PETA), 281 parts by weight of hollow silica nanoparticles (diameter: about 50 to 60 nm, density: 1.96 g/cm$^3$, manufactured by JSC Catalyst and Chemicals), 63 parts by weight of solid silica nanoparticles (diameter: about 12 nm, density: 2.65 g/cm$^3$), 131 parts by weight of a first fluorine-containing compound (X-71-1203M, Shin-Etsu Chemical), 19 parts by weight of a second fluorine-containing compound (RS-537, DIC Corporation), and 31 parts by weight of an initiator (Irgacure 127, Ciba) were diluted in MIBK (methyl isobutyl ketone) solvent so that the solid content concentration became 3 wt %.

(2) Preparation of Low Refractive Index Layer and Antireflection Film

The photocurable coating composition obtained as described above was coated onto the hard coating film of the preparation example in a thickness of about 110 to 120 nm with a #4 Meyer bar, and dried and cured at the temperature and time shown in Table 1 below.

At the time of curing, ultraviolet light of 252 mJ/cm$^2$ was irradiated to the dried coating under a nitrogen purge.

Example 5

(1) Preparation of a Photocurable Coating Composition for Preparing a Low Refractive Index Layer Based on 100 parts by weight of trimethylolpropane triacrylate (TMPTA), 268 parts by weight of hollow silica nanoparticles (diameter: about 50 to 60 nm, density: 1.96 g/cm$^3$, manufactured by JSC Catalyst and Chemicals), 55 parts by weight of solid silica nanoparticles (diameter: about 12 nm, density: 2.65 g/cm), 144 parts by weight of a first fluorine-containing compound (X-71-1203M, Shin-Etsu Chemical), 21 parts by weight of a second fluorine-containing compound (RS-537, DIC Corporation), and 31 parts by weight of an initiator (Irgacure 127, Ciba) were diluted in MIBK (methyl isobutyl ketone) solvent so that the solid content concentration became 3 wt %.

(2) Preparation of Low Refractive Index Layer and Antireflection Film

The photocurable coating composition obtained as described above was coated onto the hard coating film of the preparation example in a thickness of about 110 to 120 nm with a #4 Meyer bar, and dried and cured at the temperature and time shown in Table 1 below. At the time of curing, ultraviolet light of 252 mJ/cm$^2$ was irradiated to the dried coating under a nitrogen purge.

TABLE 1

|  | Drying temperature | Drying time |
| --- | --- | --- |
| Example 1 | 40° C. | 1 min |
| Example 2 | 60° C. | 1 min |
| Example 3 | 80° C. | 1 min |
| Example 4 | 60° C. | 2 min |
| Example 5 | 60° C. | 3 min |

Example 6

(1) Preparation of Hard Coating Layer (HD2)

30 g of pentaerythritol triacrylate, 2.5 g of a high molecular weight copolymer (BEAMSET 371, Arakawa, Epoxy Acrylate, molecular weight: 40,000), 20 g of methyl ethyl ketone, and 0.5 g of a leveling agent (Tego wet 270) were homogeneously mixed, and then 2 g of an acrylic-styrene copolymer (volume average particle diameter: 2 μm, manufacturer: Sekisui Plastic) as fine particles having a refractive index of 1.525 was added to prepare a hard coating composition.

The hard coating composition thus obtained was coated onto a triacetyl cellulose film with a #10 Meyer bar and dried at 90° C. for 1 minute. The ultraviolet light of 150 mJ/cm$^2$ was irradiated to the dried product to prepare a hard coating layer having a thickness of 5 μm.

(2) Preparation of Low Refractive Index Layer and Antireflection Film

Based on 100 parts by weight of pentaerythritol triacrylate (PETA), 135 parts by weight of hollow silica nanoparticles (diameter: about 50 to 60 nm, density: 1.96 g/cm$^3$, manufactured by JSC Catalyst and Chemicals), 88 parts by weight of solid silica nanoparticles (diameter: about 12 nm, density: 2.65 g/cm$^3$), 38 parts by weight of a first fluorine-containing compound (X-71-1203M, Shin-Etsu Chemical), 11 parts by weight of a second fluorine-containing compound (RS-537, DIC Corporation), and 7 parts by weight of an initiator (Irgacure 127, Ciba) were diluted in a 3:3:4 (weight ratio) mixed solvent of methyl isobutyl ketone (MIBK)/diacetone alcohol (DAA)/isopropyl alcohol so that the solid content concentration became 3 wt %.

The photocurable coating composition obtained as described above was coated onto the hard coating layer (HD2) prepared above in a thickness of about 110 to 120 nm with a #4 Meyer bar, and dried and cured at a temperature of 60° C. for 1 minute.

At the time of curing, ultraviolet light of 252 mJ/cm$^2$ was irradiated to the dried coating under a nitrogen purge.

Comparative Example: Preparation of Antireflection Film

Comparative Example 1

An antireflection film was prepared in the same manner as in Example 1, except that the photocurable coating composition for preparing the low reflective index layer was coated and dried at room temperature (25° C.).

Comparative Example 2

Except that 63 parts by weight of solid silica nanoparticles used in Example 1 were replaced with 63 parts by weight of pentaerythritol triacrylate (PETA), a photocurable coating composition for preparing the solid silica nanoparticles was prepared in the same manner as in Example 1 and an antireflection film was prepared in the same manner as in Example 1.

Comparative Example 3

An antireflection film was prepared in the same manner as in Example 5, except that the photocurable coating composition for preparing the low reflective index layer was coated and then dried at a temperature of about 140° C.

Experimental Examples: Measurement of Physical Properties of Antireflection Films The following experiments were conducted for the antireflection films obtained in examples and comparative examples.

1. Measurement of Reflectivity of Antireflection Film

The average reflectivity of the antireflection films obtained in the examples and comparative examples showing in a visible light region (380 to 780 nm) was measured using a Solidspec 3700 (SHIMADZU) apparatus.

2. Measurement of Antifouling Property

A straight line with a length of 5 cm was drawn with a black marker on the surface of the antireflection films obtained in the examples and comparative examples. Then, the antifouling property was measured by confirming the number of times of erasing when rubbed with a poly wiper.

<Measurement Standard>
O: Erase when rubbing 10 times or less
Δ: Erase when rubbing 11 to 20 times
X: Erase when rubbing 20 times or more 3. Measurement of Scratch Resistance The surfaces of the antireflection films obtained in the examples and comparative examples were rubbed while applying a load to steel wool and reciprocating ten times at a speed of 27 rpm.

The maximum load at which one or less scratches with a size of 1 cm or less were generated, as observed with the naked eye, was measured.

4. Confirmation of Phase Separation

In the cross-section of the antireflection film shown in FIGS. 1 to 7, it was determined that phase separation occurred when 70% by volume or more of the solid inorganic nanoparticles in the used solid inorganic nanoparticles (solid silica nanoparticles) were present within 30 nm from the hard coating layer.

5. Measurement of Reflective Index

Using elliptically polarized light and the Cauchy model measured at wavelengths of 380 nm to 1000 nm for the phase separated region of the low refractive index layers obtained in the examples, the refractive index at 550 nm was calculated.

Specifically, the ellipsometry was measured for the low refractive index layer obtained in each of the examples at an incidence angle of 70° over a wavelength range of 380 nm to 1000 nm by using a J. A. Woollam Co. M-2000 apparatus.

The measured ellipsometry data (ψ, Δ) was fitted to a Cauchy model of the following General Formula 1 using Complete EASE software for the first and second layers of the low refractive index layer so that MSE became 35 or less.

$$n(\lambda) = A + \frac{B}{\lambda^2} + \frac{C}{\lambda^4}$$ [General Formula 1]

In the above General Formula 1, n(λ) is a refractive index at a wavelength λ, λ is in a range of 300 nm to 1800 nm, and A, B, and C are Cauchy parameters.

6. Fourier Transform Analysis for the Result of X-Ray Reflectivity Measurement Using Cu—K-Alpha Rays The X-ray reflectivity was measured by irradiating Cu—K-alpha rays having a wavelength of 1.5418 Å for an antireflection film with a size of 1 cm*1 cm (width*length).

Specifically, the apparatus used was a PANalytical X'Pert Pro MRD XRD, and a voltage of 45 kV and a current of 40 mA were applied.

The optics used are as follows.
Incident beam optic: Primary mirror, Auto Attenuator, 1/16° FDS
Diffracted beam optic: Parallel plate collimator (PPC) with silt (0.27)
Soller slit (0.04 rad), Xe counter After the sample stage was adjusted so that a 2 theta (2θ) value was 0, the half-cut of the sample was confirmed. Then, the incident angle and the reflection angle were set to satisfy the specular condition, and Z⇒Omega⇒Z align. Thereby, the sample was prepared to measure X-ray reflectivity. The measurement was performed at 2θ between 0.2° and 3.2° with an interval of 0.004°.

Thus, the X-ray reflectivity pattern was measured.

The Fourier transform analysis for the result of X-ray reflectivity measurement using Cu—K-alpha rays was performed by using PANalytical's X'Pert Reflectivity program. In the Fourier transform, the input value was entered as 0.1° for start angle, 1.2° for the end angle, and 0.163° for the critical angle.

TABLE 2

| | Average reflectivity (%) | Scratch resistance (g) | Antifouling property | Phase separation | [P1] (nm) | P2] (nm) |
|---|---|---|---|---|---|---|
| xample 1 | 0.63 | 500 | ○ | ○ | 40 | 94 |
| Example 2 | 0.62 | 500 | ○ | ○ | 48 | 103 |
| Example 3 | 0.67 | 500 | ○ | ○ | 43 | 94 |
| Example 4 | 0.64 | 500 | ○ | ○ | 41 | 96.5 |
| Example 5 | 0.65 | 500 | ○ | ○ | 40.5 | 91 |
| Example 6 | 0.67 | 500 | ○ | ○ | 43 | 90.5 |
| Comparative Example 1 | 0.78 | 150 | X | X | 43 | 112 |
| Comparative Example 2 | 0.8 | 200 | Δ | X | 37 | 80 |
| Comparative Example 3 | 0.67 | 50 | X | X | 38.5 | 112 |

[P1] and [P2] are the thickness at which the extremal point of the Fourier transform magnitude on the Y-axis appears in a graph showing the result of Fourier transform analysis for the result of X-ray reflectance measurement result using Cu—K-alpha rays.

TABLE 3

| Reflective index | Example 1 | Example 2 | Example 3 | Example 4 | Example 5 | Example 6 |
|---|---|---|---|---|---|---|
| First region | 1.502 | 1.505 | 1.498 | 1.491 | 1.511 | 1.505 |
| Second region | 1.35 | 1.349 | 1.321 | 1.346 | 1.211 | 1.375 |

As confirmed in FIGS. 10 to 15, in a graph showing the result of Fourier transform analysis for the result of X-ray reflectivity measurement using Cu—K-alpha rays, the antireflection films of Examples 1 to 6 exhibited one extremum at a thickness of 35 nm to 55 nm and exhibited one extremum at a thickness of 85 nm to 105 nm. As shown in Table 2, it was confirmed that the antireflection films of the examples could exhibit low reflectivity of 0.70% or less in the visible light region, and also the high scratch resistance and antifouling properties could be simultaneously realized.

Further, as shown in FIGS. 1 to 6, it was confirmed that, in the low refractive index layer of the antireflection film of Examples 1 to 6, the hollow inorganic nanoparticles and the solid inorganic nanoparticles were phase-separated, and the solid inorganic nanoparticles were mostly present and gathered toward the interface between the hard coating layer and the low refraction layer of the antireflection film, and that the hollow inorganic nanoparticles were mostly present on the side far from the hard coating layer.

Further, as shown in Table 3, it was confirmed that, in the low reflective index layer of the examples, the first region and the second region where the hollow inorganic nanoparticles and the solid inorganic nanoparticles were phase-separated exhibited a reflective index of 1.420 or more and that the second region where the hollow inorganic nanoparticles were mainly distributed exhibited a reflective index of 1.400 or less.

On the other hand, as shown in FIGS. 7 to 9, it was confirmed that, in the low refraction layer of the antireflection film of Comparative Examples 1 to 3, the hollow inorganic nanoparticles and the solid inorganic nanoparticles were mixed without being phase-separated.

In addition, as shown in Table 2 and FIGS. 16 to 18, it was confirmed that the low refractive index layers of the antireflection films of Comparative Examples 1 to 3 did not exhibit an extremum in two thickness ranges of 35 nm to 55 nm and 85 nm to 105 nm in a graph showing the result of Fourier transform analysis for the result of X-ray reflectivity measurement using Cu—K-alpha rays, and that they had low scratch resistance and antifouling properties while exhibiting relatively high reflectivity.

The invention claimed is:

1. An antireflection film comprising a hard coating layer, and a low refractive index layer disposed on the hard coating layer, the low refractive index layer containing a binder resin, and hollow inorganic nanoparticles and solid inorganic nanoparticles dispersed in the binder resin,
   the low refractive index layer exhibiting one extremum at a thickness of 35 nm to 55 nm and another extremum at a thickness of 85 nm to 105 nm, in a graph showing a result of Fourier transform analysis for X-ray reflectivity measurement using Cu—K-alpha rays,
   wherein each of the thickness of 35 nm to 55 nm and the thickness of 85 nm to 105 nm is a thickness from a surface of the low refractive index layer,
   wherein 70% by volume or more of the entire solid inorganic nanoparticles are present within 50% of the total thickness of the low refractive index layer from the interface between the hard coating layer and the low refractive index layer.

2. The antireflection film of claim 1, wherein the graph showing the result of Fourier transform analysis for X-ray reflectivity measurement using Cu—K-alpha rays represents a Fourier transform magnitude of y-axis relative to the film thickness from a surface of the low refractive index layer of x-axis.

3. The antireflection film of claim 2, wherein the X-ray reflectivity measurement using Cu—K-alpha rays is performed for an antireflection film having a size of 1 cm*1 cm (width*length) using Cu—K-alpha rays having a wavelength of 1.5418 Å.

4. The antireflection film of claim 1, wherein the X-ray reflectivity measurement using Cu—K-alpha rays is performed for an antireflection film having a size of 1 cm*1 cm (width*length) using Cu—K-alpha rays having a wavelength of 1.5418 Å.

5. The antireflection film of claim 1, wherein 30% by volume or more of the entire hollow inorganic nanoparticles are present at a greater distance in the thickness direction of the low refractive index layer from the interface between the hard coating layer and the low refractive index layer, compared to the solid inorganic nanoparticles.

6. The antireflection film of claim 1, wherein 70% by volume or more of the entire solid inorganic nanoparticles are present within 30% of the total thickness of the low refractive index layer from the interface between the hard coating layer and the low refractive index layer.

7. The antireflection film of claim 6, wherein 70% by volume or more of the entire hollow inorganic nanoparticles are present in a region exceeding 30% of the total thickness of the low refractive index layer from the interface between the hard coating layer and the low refractive index layer.

8. The antireflection film of claim 1, wherein the low refractive index layer includes a first layer containing 70% by volume or more of the entire solid inorganic nanoparticles and a second layer containing 70% by volume or more of the entire hollow inorganic nanoparticles, and the first layer is located closer to the interface between the hard coating layer and the low refractive index layer, compared to the second layer.

9. The antireflection film of claim 8, wherein 70% or more by volume of the entire solid inorganic nanoparticles are present within 50% of the total thickness of the low refractive index layer from the interface between the hard coating layer and the low refractive index layer.

10. The antireflection film of claim 1, wherein the solid inorganic nanoparticles have a higher density by 0.50 $g/m^3$ or more compared to the hollow inorganic nanoparticles.

11. The antireflection film of claim 1, wherein each of the solid inorganic nanoparticles and the hollow inorganic nanoparticles has on the surface thereof at least one reactive functional group selected from the group consisting of a (meth)acrylate group, an epoxide group, a vinyl group, and a thiol group.

12. The antireflection film of claim 1, wherein the binder resin contained in the low refractive index layer may include a crosslinked (co)polymer between a (co)polymer of a photopolymerizable compound and a fluorine-containing compound containing a photoreactive functional group.

13. The antireflection film of claim 12, wherein the low refractive index layer includes 10 to 400 parts by weight of the hollow inorganic nanoparticles and 10 to 400 parts by weight of the solid inorganic nanoparticles, relative to 100 parts by weight of the (co)polymer of the photopolymerizable compound.

14. The antireflection film of claim 12, wherein each of the fluorine-containing compounds containing the photoreactive functional group has a weight average molecular weight of 2000 to 200,000.

15. The antireflection film of claim 12, wherein the binder resin includes 20 to 300 parts by weight of the fluorine-containing compound containing the photoreactive functional group based on 100 parts by weight of the (co)copolymer of the photopolymerizable compound.

16. The antireflection film of claim 1, wherein the hard coating layer includes a binder resin containing a photocurable resin, and organic or inorganic fine particles dispersed in the binder resin.

17. The antireflection film of claim 16, wherein the organic fine particles have a particle diameter of 1 to 10 μm, and the inorganic fine particles have a particle diameter of 1 nm to 500 nm.

* * * * *